United States Patent
Joyce et al.

(10) Patent No.: US 12,242,444 B2
(45) Date of Patent: Mar. 4, 2025

(54) GENERATING RULES FOR DATA PROCESSING VALUES OF DATA FIELDS FROM SEMANTIC LABELS OF THE DATA FIELDS

(71) Applicant: Ab Initio Technology LLC, Lexington, MA (US)

(72) Inventors: John Joyce, Newton, MA (US); Marshall A. Isman, Newton, MA (US); Sandrick Melbouci, Myersville, MD (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/545,416

(22) Filed: Dec. 19, 2023

(65) Prior Publication Data
US 2024/0152495 A1  May 9, 2024

Related U.S. Application Data

(63) Continuation of application No. 17/006,504, filed on Aug. 28, 2020, now Pat. No. 11,886,399.
(Continued)

(51) Int. Cl.
*G06F 16/00* (2019.01)
*G06F 16/215* (2019.01)
(Continued)

(52) U.S. Cl.
CPC ........ *G06F 16/215* (2019.01); *G06F 16/2228* (2019.01); *G06F 16/285* (2019.01); *G06N 5/04* (2013.01); *G06N 20/00* (2019.01)

(58) Field of Classification Search
CPC .. G06F 16/215; G06F 16/285; G06F 16/2228; G06N 5/04; G06N 20/00
(Continued)

(56) References Cited

U.S. PATENT DOCUMENTS

| 7,587,636 B2 | 9/2009 | Tillman et al. |
| 7,756,873 B2 | 7/2010 | Gould et al. |
| (Continued) |

FOREIGN PATENT DOCUMENTS

| CN | 101802776 | 8/2010 |
| CN | 106528874 | 3/2017 |
| (Continued) |

OTHER PUBLICATIONS

[No Author Listed], "Informatica Advanced Masking Solution," Informatica, 2018, 3 pages.
(Continued)

*Primary Examiner* — Alexandria Y Bromell
(74) *Attorney, Agent, or Firm* — Fish & Richardson P.C.

(57) ABSTRACT

Methods and systems are configured to determine a semantic meaning for data and generate data processing rules based on the semantic meaning of the data. The semantic meaning includes syntactical or contextual meaning for the data that is determined, for example, by profiling, by the data processing system, values stored in a field included in data records of one or more datasets; applying, by the data processing system, one or more classifiers to the profiled values; identifying, based on applying the one or more classifiers, one or more attributes indicative of a logical or syntactical characteristic for the values of the field, with each of the one or more attributes having a respective confidence level that is based on an output of each of the one or more classifiers. The attributes are associated with the fields and are used for generating data processing rules and processing the data.

20 Claims, 21 Drawing Sheets

Related U.S. Application Data

(60) Provisional application No. 62/981,646, filed on Feb. 26, 2020.

(51) Int. Cl.
*G06F 16/22* (2019.01)
*G06F 16/28* (2019.01)
*G06N 5/04* (2023.01)
*G06N 20/00* (2019.01)

(58) Field of Classification Search
USPC .................................................. 707/694
See application file for complete search history.

(56) References Cited

U.S. PATENT DOCUMENTS

| | | | |
|---|---|---|---|
| 7,849,075 B2 | 12/2010 | Gould et al. | |
| 8,082,243 B2 | 12/2011 | Gorelik et al. | |
| 8,379,939 B1 | 2/2013 | Bourdev et al. | |
| 8,583,747 B2* | 11/2013 | Buchheit | G06Q 10/107 707/711 |
| 8,732,213 B2 | 5/2014 | Sowell et al. | |
| 8,868,580 B2 | 10/2014 | Gould et al. | |
| 9,792,351 B2 | 10/2017 | Hernandez-Sherrington et al. | |
| 10,198,460 B2 | 2/2019 | Gorelik | |
| 10,409,802 B2 | 9/2019 | Spitz et al. | |
| 10,459,954 B1 | 10/2019 | Walters et al. | |
| 10,489,360 B2 | 11/2019 | Procops et al. | |
| 10,552,443 B1* | 2/2020 | Wu | G06F 16/2228 707/707 |
| 10,565,177 B2* | 2/2020 | Gausman | G06F 16/2272 707/707 |
| 11,704,494 B2 | 7/2023 | Butler et al. | |
| 11,886,399 B2 | 1/2024 | Joyce et al. | |
| 2007/0027674 A1 | 2/2007 | Parson et al. | |
| 2008/0027860 A1 | 1/2008 | Mullen et al. | |
| 2008/0201172 A1 | 8/2008 | McNamar | |
| 2009/0123419 A1 | 5/2009 | Sherman et al. | |
| 2009/0276446 A1 | 11/2009 | Graf et al. | |
| 2011/0196670 A1 | 8/2011 | Dang et al. | |
| 2012/0030160 A1 | 2/2012 | Ratnam et al. | |
| 2012/0109982 A1 | 5/2012 | Jayakody et al. | |
| 2012/0254333 A1 | 10/2012 | Chandramouli et al. | |
| 2013/0006914 A1 | 1/2013 | Ray et al. | |
| 2013/0073594 A1 | 3/2013 | Jugulum et al. | |
| 2014/0108357 A1 | 4/2014 | Procops et al. | |
| 2014/0108460 A1 | 4/2014 | Casella dos Santos et al. | |
| 2014/0280062 A1 | 9/2014 | Augustin et al. | |
| 2015/0095296 A1* | 4/2015 | Nandwani | H04L 63/105 707/694 |
| 2015/0254230 A1 | 9/2015 | Papadopoullos et al. | |
| 2016/0042225 A1 | 2/2016 | Barak | |
| 2016/0055427 A1 | 2/2016 | Adjaoute | |
| 2016/0283527 A1 | 9/2016 | Vandiver et al. | |
| 2016/0364325 A1 | 12/2016 | Ouzzani et al. | |
| 2017/0060894 A1 | 3/2017 | Gorelik | |
| 2017/0068891 A1 | 3/2017 | Shironoshita | |
| 2017/0139975 A1 | 5/2017 | Chow et al. | |
| 2017/0193838 A1 | 7/2017 | Buchenau et al. | |
| 2017/0235848 A1 | 8/2017 | Van Dusen et al. | |
| 2018/0060404 A1 | 3/2018 | Sun et al. | |
| 2018/0107694 A1 | 4/2018 | Dupey et al. | |
| 2018/0240019 A1 | 8/2018 | Sato et al. | |
| 2019/0215331 A1 | 7/2019 | Anakata et al. | |
| 2019/0220508 A1 | 7/2019 | Hu | |
| 2020/0012626 A1 | 1/2020 | Walters et al. | |
| 2020/0012666 A1 | 1/2020 | Walters et al. | |
| 2020/0110736 A1* | 4/2020 | Bauman | G06F 16/22 707/707 |
| 2020/0301950 A1 | 9/2020 | Lorrain-Hale et al. | |
| 2020/0380212 A1* | 12/2020 | Butler | G06F 40/30 707/707 |
| 2021/0192394 A1* | 6/2021 | McKay | G06N 3/091 707/707 |
| 2021/0263900 A1 | 8/2021 | Joyce et al. | |
| 2022/0245175 A1 | 8/2022 | Hawco et al. | |
| 2023/0409835 A1 | 12/2023 | Butler et al. | |
| 2024/0095219 A1 | 3/2024 | Joyce et al. | |
| 2024/0126734 A1 | 4/2024 | Joyce et al. | |
| 2024/0126735 A1 | 4/2024 | Joyce et al. | |

FOREIGN PATENT DOCUMENTS

| | | |
|---|---|---|
| CN | 106687952 | 5/2017 |
| CN | 106897424 | 6/2017 |
| CN | 109635288 | 4/2019 |
| EP | 3745276 | 12/2020 |
| JP | 2015-533436 | 11/2015 |
| JP | 2018-151805 | 9/2018 |
| WO | WO 2015084408 | 6/2015 |
| WO | WO 2018025706 | 2/2018 |

OTHER PUBLICATIONS

Haldeman, "Compare IBM data masking solutions: InfoSphere Optim and DataStage," IBM Corporation, Nov. 15, 2012, 10 pages.
International Preliminary Report on Patentability in International Appln. No. PCT/US2021/019572, mailed on Sep. 9, 2022, 10 pages.
International Search Report and Written Opinion in International Appln. No. PCT/US2021/019572, dated Jul. 22, 2021, 17 pages.
Invitation to Pay Additional Fees and, Where Applicable, Protest Fee in International Appln. No. PCT/US2021/019572, dated Jun. 11, 2021, 12 pages.
Office Action in Japanese Appln. No. 2022-550704, mailed on May 23, 2024, 7 pages (with Machine translation).
[No Author Listed] [online], "Get started with data profiling through automatic semantic discovery, Part II—Talend 6 Features," Talend, Nov. 10, 2015, Internet Archive: Wayback Machine URL<https://web.archive.org/web/20210721010236/https://www.youtube.com/watch?v=EltwXhaPASM>, retrieved on Oct. 3, 2024, <https://www.youtube.com/watch?v=EltwXhaPASM>, 173 pages [Video Submission].
Anonymous, "Using AI and Machine Learning to Power Data Fingerprinting," Waterline Data, 2017, 6 pages.
Chen et al., "Generating Schema Labels through Dataset Content Analysis," Proceedings of the Web Conference 2018, Apr. 23-27, 2018, Lyon, France, 1515-1522.
EP Extended Search Report in European Appln. No. 20177617.6, dated Sep. 7, 2020, 10 pages.
IBM.com [Online], "Semantic Concept Discovery Over Event Databases," retrieved Dec. 10, 2019, retrieved from URL<https://www.ibm.com/blogs/research/2018/07/semantic-concept-discovery/>, 4 pages.
International Preliminary Report on Patentability in International Appln. No. PCT/US2020/035226, dated Dec. 9, 2021, 9 pages.
International Search Report and Written Opinion in International Appln. No. PCT/US2020/035226, dated Aug. 19, 2020, 11 pages.
International Search Report and Written Opinion in International Appln. No. PCT/US2023/074617, mailed on Jan. 3, 2024, 11 pages.
Naumann, "Data Profiling Revisited," ACM SIGMOD Record, Feb. 2014, 42(4):40-49.
Office Action in Canadian Appln. No. 3,142,252, mailed on Jan. 30, 2024, 8 pages.
Office Action in Chinese Appln. No. 202080039989.0, mailed on Jul. 15, 2024, 11 pages (with English Translation).
Office Action in European Appln. No. 20177617.6, dated Aug. 5, 2022, 10 pages.
Office Action in European Appln. No. 20177617.6, mailed on Oct. 31, 2023, 10 pages.
Office Action in Japanese Appln. No. 2021-571432, dated Jul. 8, 2024, 9 pages (with English Translation).
Office Action in Singapore Appln. No. 11202112388X, dated Aug. 15, 2024, 9 pages.
Pham et al., "Semantic Labeling: A Domain-Independent Approach," Proceedings of the 15th International Semantic Web Conference, Oct. 17-21, 2016, Kobe, Japan, 446-462.
Talend [Online] "Get started with data profiling through automatic semantic discovery, Part II - Talend 6 Features," published on Nov.

(56) References Cited

OTHER PUBLICATIONS 10, 2015, retrieved Dec. 10, 2019, URL<https://www.youtube.com/watch?v=EltwXhaPASM&feature=emb_title>, 1 page [Video Submission].

talend.com [Online] "Semantic Discovery," retrieved Dec. 10, 2019, retrieved from URL<https://help.talend.com/reader/nAXiZWoj0H~2~YApZIsRFw/uLT6CFkPAjCbZ30Tf9juFw> 8 pages.

techopedia.com [Online] "Semantic Data Model—General process of adding meaning to data and the relationships that lie between them," retrieved on Dec. 10, 2019m retrieved from URL<https://www.techopedia.com/definition/30489/semantic-data-model>, 1 page.

Wikipedia.org [online], "Rule-based system," May 16, 2019, retrieved on Aug. 10, 2020, retrieved from URL<https://en.wikipedia.org/w/index/php?title=Rule-based system&oldid=897374778>, 2 pages.

\* cited by examiner

FIG. 6C

900 

```
┌─────────────────────────────────────────────────────────────┐
│ Receiving one or more datasets, with the one or more datasets│
│                                                         902 │
└─────────────────────────────────────────────────────────────┘
                              ↓
┌─────────────────────────────────────────────────────────────┐
│ Profiling the values stored in the field included in the one or more │
│                          datasets                           │
│                                                         904 │
└─────────────────────────────────────────────────────────────┘
                              ↓
┌─────────────────────────────────────────────────────────────┐
│         Applying one or more classifiers to the profiled values │
│                                                         906 │
└─────────────────────────────────────────────────────────────┘
                              ↓
┌─────────────────────────────────────────────────────────────┐
│ Identifying one or more label proposals identifying a semantic │
│                    meaning for the field                    │
│                                                         908 │
└─────────────────────────────────────────────────────────────┘
                              ↓
┌─────────────────────────────────────────────────────────────┐
│              Labeling the field with a label proposal       │
│                                                         910 │
└─────────────────────────────────────────────────────────────┘
                              ↓
┌─────────────────────────────────────────────────────────────┐
│             Determining a ruleset profile for the field     │
│                                                         912 │
└─────────────────────────────────────────────────────────────┘
                              ↓
┌─────────────────────────────────────────────────────────────┐
│     Determining a data quality rule for the field of the dataset │
│                                                         914 │
└─────────────────────────────────────────────────────────────┘
```

FIG. 9

1100

Receiving one or more datasets, with the one or more datasets
1102

Profiling the values stored in the field included in the one or more datasets
1104

Applying one or more classifiers to the profiled values
1106

Identifying one or more label proposals identifying a semantic meaning for the field and labeling the field
1108

Determining, based on the label proposal, that the field of the dataset represents sensitive data
1110

Performing a data masking function to transform values including the sensitive data
1112

FIG. 11

GENERATING RULES FOR DATA PROCESSING VALUES OF DATA FIELDS FROM SEMANTIC LABELS OF THE DATA FIELDS

CLAIM OF PRIORITY

This application is a continuation of U.S. patent application Ser. No. 17/006,504, filed on Aug. 28, 2020, which claims priority under 35 U.S.C. § 119(e) to U.S. Patent Application Ser. No. 62/981,646, filed on Feb. 26, 2020, the entire contents of which are hereby incorporated by reference.

TECHNICAL FIELD

This disclosure relates to generating rules for processing data of data fields based on the result of a classification of the values of the data fields. More specifically, this disclosure relates to classifying data fields by analyzing a data profile of the data and metadata of the data fields, and generating one or more rules for processing the data of the data fields.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

A set of data can include data values stored in data fields. A data field can include one or more of the data values. Many instances of the data field can exist in the dataset (e.g., in different fields).

SUMMARY

The system described in this document is configured for generating one or more rules for processing data from semantic labels of the data being processed. The labels indicate the semantic meaning of the data being labeled. The semantic meaning of data is what the data represents in practical terms. For example, the semantic meaning may indicate that a particular field represents a date, and that the data represented is a date of birth for a user profile. The semantic meaning of the data can indicate how the data are handled by the data processing system. More specifically, the data processing system is configured to receive data values of data fields that are labeled with semantic labels. The data processing system is configured to generate one or more rules for processing the data values of a data field depending on what the label is for that data field. The rules can include data masking rules, data quality rules, rules for generating test data, rules for determining a schema, or other such rules. Generally, the rules that are applied to the labeled data depend on the semantic meaning of the data, even if the overall class of rules (e.g., data quality rules) are being applied to all the data. For example, data quality rules for dates of birth can be different than data quality rules for dates of expiration, though both are dates and have similar formats. The data processing system determines the semantic meaning of data, labels the data with a label indicating the semantic meaning, and generates one or more rules for processing that data based on the label.

Embodiments can include one or more of the following features.

In an aspect, a process is for determining a data quality rule for values in a field of a data record in a set of data records based on a label associated with the field, the label indicating the characteristics of the values of the field. The process is implemented by a data processing system. The process includes retrieving a label index that associates a label with a set of one or more fields in a data record, wherein the label identifies the type of information expected in each field of the set of one or more fields. The process includes accessing a data dictionary that associates the type of information indicated by the label with a set of attribute values representing requirements for values of the one or more fields associated with the label, the requirements including logical or syntactical characteristics of the values for the one or more fields. The process includes, for a field of a particular data record: identifying, by accessing the label index, a particular label associated with the field of the particular data record; retrieving, from the data dictionary, an attribute value for the particular label, the attribute value specifying a particular requirement for the field. The process includes generating a data quality rule that, when executed, is configured to: validate whether a value of the field satisfies the particular requirement represented by the attribute value, and generate output data indicating whether the particular requirement is satisfied.

In some implementations, the data quality rule is indicative of one or more of: an allowable deviation for the value in the field from the requirement, one or more allowable values in the field, and one or more prohibited values in the field. In some implementations, the one or more allowable values or prohibited values in the field are associated with a field name of the field. In some implementations, the field is a first field, and wherein the one or more allowable values or prohibited values in the field are determined based on a value in a second field in the particular data record, the second field being related to the first field of the particular data record. In some implementations, the one or more allowable values or prohibited values are based on a combination of the value in the second field and the value in the first field. In some implementations, the one or more allowable values correspond to values that satisfy a numerical function, and wherein the one or more prohibited values correspond to values that do not satisfy the numerical function.

In some implementations, the field is a first field, wherein the data record comprises a second field, wherein the data quality rule is a first data quality rule, and wherein the method comprises: determining, based on the attribute value for the particular label, that a relationship exists between the first field and the second field; and generating a second data quality rule for the second field based on the relationship between the second field and the first field. In some implementations, the relationship is indicative of a dependency of a value of the second field on a value of the first field or the value of the first field on the value of the second field. In some implementations, the relationship is indicative of a correlation between a value of the first field and a value of the second field. In some implementations, the process includes obtaining validation data that validates the relationship for each value of the first field and the second field. In some implementations, the relationship is validated for a threshold number of values for the first field and the second field. In some implementations, the second data quality rule is configured to enforce a constraint on a value of the second field based on a value of the first field. In some implementations, determining that the relationship exists between the first field and the second field comprises determining that a value of the second field comprises a key value referenced by a value of the first field, and wherein the data quality rule is configured to require that each value of the second field is a valid key value. In some implementations, the first field and the second field each comprises numeric values, and wherein determining that the relationship exists between the first field and the second field comprises determining a numerical function that relates values of the first field to values of the second field. In some implementations, determining that the relationship exists between the first field and the second field comprises using at least one classifier configured by a machine learning process.

In some implementations, the process includes determining that the attribute value associated with the particular label indicates that the field comprises primary key values for the particular data record. In some implementations, the process includes configuring the data quality rule to require that the primary key values are each unique in the field.

In some implementations, the attribute value for the particular label represents at least one of an average for the values in the field, a maximum length for the values, a minimum length for the values, a data type for the values, and a format for the values. In some implementations, the particular data record is a first data record, and wherein the method comprises applying the data quality rule to another field associated with the particular label in a second data record that is different than the first data record. In some implementations, the method comprises storing data associating the data quality rule and the particular label.

In some implementations, the process includes generating data for requesting approval of the data quality rule; and approving the data quality rule in response to obtaining approval data indicative of approval of the data quality rule.

In some implementations, generating the data quality rule includes: determining a historical trend for values in the field; and generating a requirement based on the historical trend for the values in the field.

In some implementations, generating the data quality rule for the field includes: identifying a historical average of a value in the field; and generating a requirement based on the historical average of the value in the field.

Embodiments can include one or more of the following features.

A process is executed by a data processing system for selecting test data to cause execution of a processing rule during testing of a data processing application. The process includes retrieving a label index that associates a label with a set of one or more fields in a data record, wherein the label identifies the type of information expected in each field of the set of one or more fields. The process includes accessing a data dictionary that associates the type of information indicated by the label with a set of attribute values representing requirements for values of the one or more fields associated with the label, the requirements including logical or syntactical characteristics of the values for the one or more fields. The process includes, for a field of a particular data record: identifying, by accessing the label index, a particular label associated with the field of the particular data record; retrieving, from the data dictionary, an attribute value for the particular label, the attribute value specifying a particular requirement for the field; generating a subsetting rule that, when executed, specifies whether a value of the field includes the attribute value; selecting a subset of fields from the particular data record according to the subsetting rule, wherein each selected field includes values that have the attribute value; and providing the selected subset to a data processing application for testing of the data processing application.

In some implementations, the process includes processing a first data record using a data processing application that includes a processing rule configured to operate on a value of a field of the first data record and generate at least one output value, the field being associated with the label. The process includes obtaining execution information indicative of a number of times the processing rule was executed in connection with processing of the first data record, wherein whether the processing rule is executed by the data processing application during processing of the first data record depends directly or indirectly on values of the field associated with the label. In some implementations, the subsetting rule is determined based on the execution information indicative of the number of times the processing rule was executed in connection with processing the first data record, the subsetting rule including an identification of the field of the first data record.

In some implementations, the subsetting rule identifies the field as a key field of the particular data record comprising at least one key value for a data element of the particular data record. In some implementations, the subset of fields of the particular data record comprises fields having key values with predetermined values. In some implementations, the subsetting rule identifies a list of key field names corresponding to the label, and wherein the subsetting rule identifies the field as the key field by comparing the attribute value of the label to the list of key fields. In some implementations, the field of the particular data record comprises personally identifying information (PH), and wherein the method further comprises selecting the subset of the fields of the particular data record in which no fields include PII information. In some implementations, the field of the particular data record comprises personally identifying information (PH), and wherein the method further comprises: applying a masking function to the PII to generated masked data, and selecting the subset, of the fields of the particular data record, that includes the masked data.

Embodiments can include one or more of the following features.

In a general aspect, a process is executed by a data processing system configured for masking data of a data processing application. The process includes retrieving a label index that associates a label with a set of one or more fields in a data record, wherein the label identifies the type of information expected in each field of the set of one or more fields. The process includes accessing a data dictionary that associates the type of information indicated by the label with a set of attribute values representing requirements for values of the one or more fields associated with the label, the requirements including logical or syntactical characteristics of the values for the one or more fields. The process includes, for a field of a particular data record: identifying, by accessing the label index, a particular label associated with the field of the particular data record; retrieving, from the data dictionary, an attribute value for the particular label, the attribute value specifying a particular requirement for the field; and determining, based on the attribute value, that the field of the particular data record represents sensitive data. The process includes, in response to the determining, performing a data masking function to transform values including the sensitive data of the field into masked values.

In some implementations, the field is a first field and wherein the label is a first label. The process includes determining that a relationship exists between the first field having the first label and a second field having a second label. The process includes in response to determining that the relationship exists, performing the data masking function to transform values in the second field into masked values. In some implementations, determining that the relationship exists comprises determining that the first label and the second label are associated with a common data source. In some implementations, the common data source comprises a user profile. In some implementations, the relationship is indicative of a dependency of a value of the second field on a value of the first field or the value of the first field on the value of the second field. In some implementations, the relationship is indicative of a correlation between first values of the first field and second values of the second field. In some implementations, the relationship comprises an arithmetic function. In some implementations, the process includes selecting a type of the data masking function based on a type of the relationship.

In some implementations, a type of the data masking function comprises at least one of a shuffling function, data encryption, character scrambling, and data substitution. In some implementations, the process includes scanning the particular data record to determine whether one or more particular values of at least one other field are transformed into masked values. In some implementations, the process includes selecting a type of the data masking function based on the attribute value of the label. In some implementations, a first data masking function is selected for a first field, of the particular data record, comprising numeric values, and wherein a second, different masking function is selected for a second field, of the particular data record, comprising non-numeric values.

In some implementations, the process includes selecting a type of the data masking function based on the label for another field that is related to the field. In some implementations, the sensitive data includes personally identifying information (PH).

Embodiments can include one or more of the following features.

In a general aspect, a process is executed by a data processing system configured for determining a schema of a data record. The process includes retrieving a label index that associates a label with a set of one or more fields in a data record, wherein the label identifies the type of information expected in each field of the set of one or more fields. The process includes accessing a data dictionary that associates the type of information indicated by the label with a set of attribute values representing requirements for values of the one or more fields associated with the label, the requirements including logical or syntactical characteristics of the values for the one or more fields. The process includes, for a first field of a particular data record: identifying, by accessing the label index, a particular label associated with the first field of the particular data record; retrieving, from the data dictionary, an attribute value for the particular label, the attribute value specifying a particular requirement for the first field; determining that the attribute value represents a schema feature for values included in the first field; determining, based on the schema feature, that the first field having the label comprises key values being referenced by values of a second field; and in response to the determining, updating schema data describing the particular data record to reference that the first field comprises the key values being referenced by the values of the second field.

In some implementations, the process includes generating a dataflow graph based on the schema data. In some implementations, the second field is in a second data record that is different from the particular data record.

In some implementations, the process includes generating a join function configured to join the particular data record to the second data record based on the key values. In some implementations, the second field is associated with a second label that is different from the label.

Embodiments can include one or more of the following features.

In a general aspect, a process for determining a data quality rule for values in one or more datasets is implemented by a data processing system and includes profiling, by the data processing system, values stored in a field included in data records of one or more datasets. The process includes applying, by the data processing system, one or more classifiers to the profiled values. The process includes identifying, based on applying the one or more classifiers, one or more attributes indicative of a logical or syntactical characteristic for the values of the field, with each of the one or more attributes having a respective confidence level that is based on an output of each of the one or more classifiers. The process includes associating, with the field, one or more of the identified attributes for which the confidence level satisfies a threshold level. The process includes determining, based on the one or more attributes associated with the field, one or more constraints for values included in the field. The process includes, based on the determined one or more constraints, determining a data quality rule for the field of the dataset, the data quality rule indicating a relationship between values of the field and the one or more constraints.

Any of these processes can be implemented as systems including one or more processing devices and memory storing instructions that, when executed by the one or more processing devices, are configured to cause the one or more processing devices to perform the operations of the processes. In some implementations, one or more non-transitory computer readable media can be configured to store instructions that, when executed by the one or more processing devices, are configured to cause the one or more processing devices to perform the operations of the processes Aspects can include one or more advantages. For instance, the techniques described herein enable a data processing system to automatically generate one or more rules for processing the data of data fields of a dataset. Once the semantic meaning of the data are known, the data processing system determines which data processing operations to apply to the data values to accomplish a specified goal of an application. The data processing system can thus automatically determine how to process different data fields of the dataset to accomplish a goal for the entire dataset, such as masking data values, enforcing data quality rules, identifying a schema of the dataset, and/or selecting test data for testing another application. Automatically determining which data fields have which semantic meanings can enable these rules to be applied to large datasets in which it may be impractical or impossible for a user to manually label each field. For example, for datasets with hundreds, thousands, or even millions of tables, it might be impractical to manually label each field in order to enforce a rule such as a data masking rule. In another example, it might be useful to automatically mask sensitive data prior to any user viewing the sensitive data. In another example, the data processing system can mask sensitive data that is stored in data fields that are not intended to include sensitive data.

The data processing system also determines which data fields do not need to be processed in accordance with the data processing rules. For example, the data processing system can determine that a data field does not need to be masked. Determining which data fields need not be processed by data processing operations saves processing time of the entire dataset for ensuring that the specified goal (e.g., masking) of an application is satisfied.

The data processing system overcomes at least one or more of the following challenges for applying rules to datasets. Often, data fields of a dataset are not named in a standardized manner such that the names of the data fields are reliable indicators of the content of the data fields. It is often important for a data processing system to know the meaning of data values of data fields of a dataset because the processing requirements for a data field for accomplishing the specified goal of an application often depend on the meaning of the data values in the data field. For example, if the goal of the application is to mask personally identifying information (PII), the data processing system determines which data of the dataset includes PII before applying masking functions to those data. In some implementations, a particular data field may require application of a particular masking function (e.g., to satisfy a security requirement for the data values of that data field). Furthermore, the data processing system is configured to determine the meaning of the data values for a data field, which can be difficult because the meaning is not always apparent from the field name, the format of the data values of the field, or the data values themselves.

The details of one or more embodiments are set forth in the accompanying drawings and the description below. Other features and advantages will be apparent from the description and drawings, and from the claims.

BRIEF DESCRIPTION OF THE DRAWINGS

FIGS. 9-12 show flow diagrams each including an example process.

DETAILED DESCRIPTION

Figure 1:
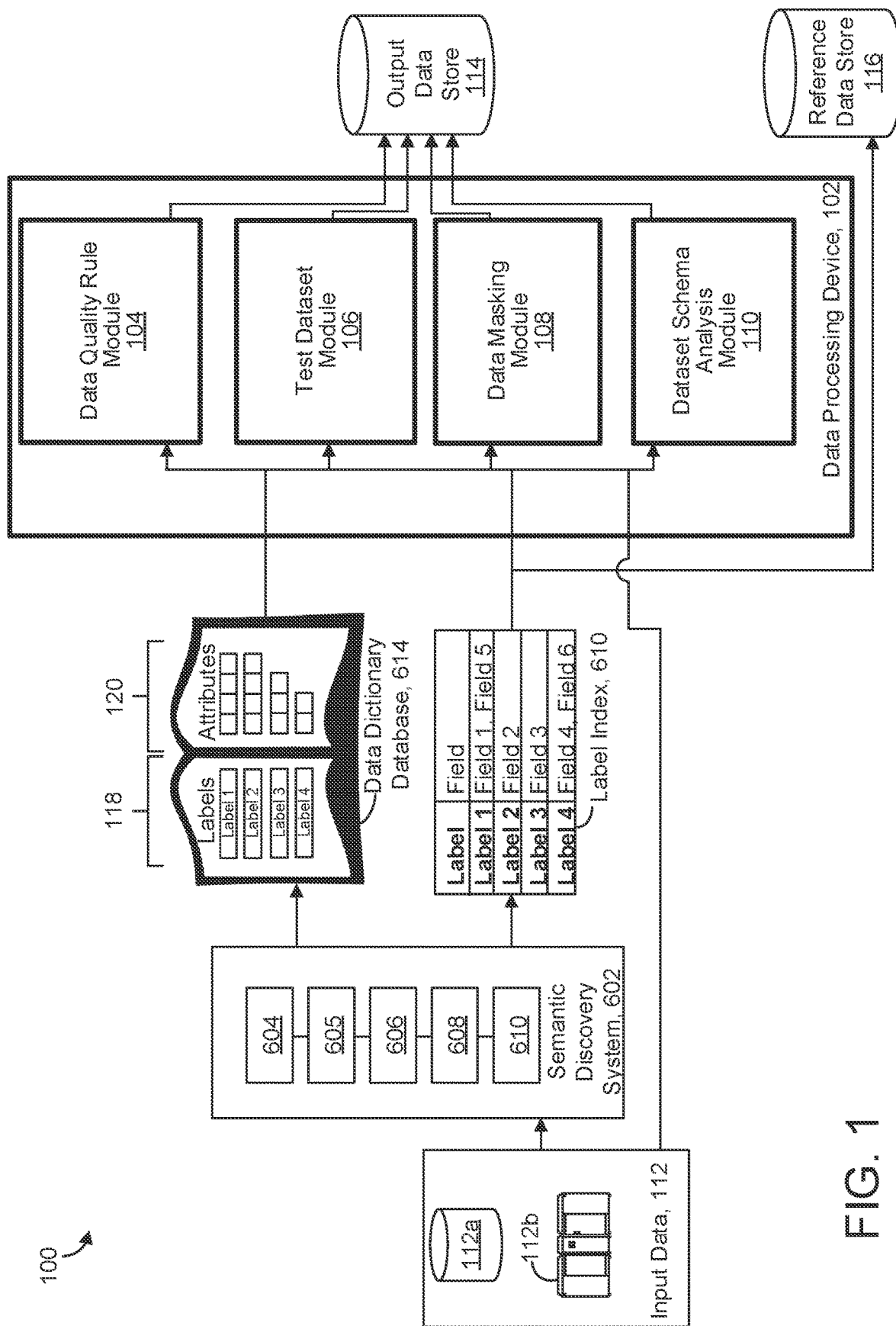
FIG. 1 is a block diagram of a data processing system.

FIG. 1 is a block diagram of a data processing system 100. The data processing system 100 is configured to process data records from input data 112. The data processing system includes a semantic discovery system 602 and a data processing device 102. The semantic discovery system 602 is configured to determine a meaning (e.g., a semantic meaning) of values for one or more fields of the data records. The semantic discovery system 602 can label each of the fields with a semantic label 118 that is selected from a data dictionary database 614. The semantic label 118 (also called a label) is associated with one or more attributes 120 in the data dictionary database 614. The attributes associated with the semantic label 118 define a semantic meaning of the label.

The data processing device 102 is configured to receive the label index 610 and the data dictionary database 614 from the semantic discovery system 602, as well as the input data 112. The data processing device 102 is configured to process the input data 112 based on labels of the label index 614 and the labels and attributes 120 of the data dictionary database 614. The label 118 of the database 614 and the label index 610 are generated by the semantic discovery process of the semantic discovery system 602.

The semantic discovery system 602 is configured to receive the input data 112 and determine a semantic meaning of fields of the input data. The semantic meaning of a field is a description of the practical (e.g., business) meaning of the values of the field, and is subsequently described in further detail. To determine the semantic meaning of the fields of the input data 112, the semantic discovery system 602, the semantic discovery system 602 profiles the input data 112 and performs a plurality of classifications that analyze the profile data and the values of the fields. The classifications of the profile data and the values of the fields enable the semantic discovery system 602 to determine what attributes are most associated with a field. Attributes 120 include metadata (or other data) that indicate properties of a given field. For example, attributes 120 can indicate a particular format, a particular relationship of the field with another field or fields, allowed or prohibited values for the field, associated key terms or business terms, statistical criteria for the value(s) of the associated field (either individually, in relation to other values of the field, or for the values of the field as a group), and so forth.

The semantic discovery system 602 is configured to generate the label index 610 that associates fields of the data records of the input data 112 with labels 118 in the data dictionary database 614. When a field of the data record is being processed by the data processing device 102, semantic labels 118 associated with the field (if any) can be retrieved using the label index 610.

A semantic label (e.g., of labels 118) includes a term or set of terms (generally a string of words or alphanumeric characters) that indicate a semantic meaning of the data of a field labeled by the semantic label. The semantic label 118 is a recognized term or set of terms that appear in a data dictionary associated with the data processing system. Each semantic label 1118 is associated with one or more fields of the dataset. For example, a table can relate the semantic label 118 to each field (or each instance of each field) in the dataset that have data values with the meaning of the semantic label.

In some implementations, the semantic discovery system 602 does not necessarily generate an actual label to identify the semantic meaning of the field, but rather associates the field with corresponding attributes 120 indicating the semantic meaning. For example, the label index 610 can associate the field with an entry in the data dictionary database 614 including one or more attributes 120, without including a specified label for the field. In other implementations, a label is used as shorthand indicating a set of one or more of the attributes 120 of the data dictionary database 614 that represent the semantic meaning of the field.

Generally, a semantic meaning for a field can correspond to a practical meaning or a contextual meaning of the values of the field. The practical meaning (e.g., a business meaning) or contextual meaning represents one or more syntactical characteristics of the data values and/or contextual indicators of the data values in the data record. The one or more syntactical characteristics, when interpreted together, convey how the values are processed by one or more modules of the data processing device 102 that are using the values of the data records for various applications. The syntactical characteristics are indicated by the attributes 120 associated with each label 118 in the data dictionary database 614. For example, for data values that correspond to dates, the semantic meaning can indicate that the date values represent dates of birth (e.g., for customers or users associated with the data records). In another example, the semantic meaning can indicate that a numerical identifier represents a social security number, which is a particular kind of numerical identifier and which has particular properties unique to social security numbers. In another example, a semantic meaning can indicate that values of two different fields together convey a business meaning when grouped together. For example, if a number is identified as a zip code, and that number is paired with other fields that have been identified as representing city names and state names, the semantic discovery system 602 is configured to determine that a semantic meaning of all three fields together is an address. Further examples of semantic meaning are subsequently described in detail.

In some implementations, the semantic meaning of a field includes the practical meaning (e.g., business meaning or real-world meaning) of data in the field. The semantic meaning can be more specific than indicating what kind of data the field includes. For example, a field may be identified from a data profile to include dates. The data processing system 100 can determine that the field includes dates because of the length of values (e.g., average length of values) in the field. The data processing system 100 can determine that the field includes dates because of the format (e.g., the values are all numbers, or conform to a format of ##\##\####, and so forth). Other statistical data can indicate to the data processing system 100 that the field includes dates. However, the semantic meaning of the field could be that the field represents a date of birth for a user of an application, which may be distinguished from other dates associated with the user, such as a date of creation of the user's profile.

As previously described, the semantic label 118 is associated with one or more attributes 120 in the data dictionary database 116. The attributes 120 indicate the meaning of the data values in the data field. The attributes 120 can indicate that the data values have particular properties. For example, the attributes 120 can indicate that the data values include personally identifiable information (PII). The attributes 120 can indicate that the data values of the data field have a particular relationship to other data fields. For example, the attributes 120 can indicate that the data field includes key values for a database. The attributes 120 can indicate a specific meaning of the data values in the fields implied by the formats of the data values, by the data values themselves, by the name of the data field, and by comparisons of the data values of the data field to other values of other data fields in the dataset. For example, the attributes 120 can indicate that the data values of a data field include dates of birth (rather than merely dates or dates for some other purpose). The semantic discovery process of the semantic discovery system 602 is subsequently described in greater detail with respect to FIG. 8.

In some implementations, the semantic label (or attributes 120 associated with a label) can be associated with a group of fields, rather than a single field. For example, if fields in a group of fields are determined to represent a street name, a street number, a zip code, and a city, respectively, the semantic discovery process can determine that this group of fields together represents addresses, and associate address attributes with the group of fields. For example, the attributes 120 can indicate that all of these fields should be included in the group in a set of given data (e.g., for data quality checks for missing portions of addresses). In some implementations, the attributes 120 can indicate that the fields together represent PII, but individually do not represent PII. This can be useful for data masking checks. For example, if all the fields are included in a dataset, a data masking module 108 can determine that data masking is needed, wherein data masking is not needed if only one of the fields is included in a dataset. This can also be useful for schema analysis, in which the attributes indicate that each field in the group is correlated with the other fields. Other such examples are possible for multi-field analysis, which is described in detail below.

As shown in FIG. 1, when the data processing system 100 labels a field with a semantic label 118, the field is associated with the attributes 120 of the semantic label. The rules modules 104, 106, 108, and 110 of the data processing device 102 use the attributes 120 to determine what rule(s) to apply to a given field of the dataset or what rules to generate for a given field of the dataset. The data processing device 102 is able to process the data of each field in a unique way automatically by applying different rules to each field. The data processing device 102 is able to generate rules for processing the given field of a dataset.

The modules 104, 106, 108, and 110 of the data processing device 102 are configured to process the input data in accordance with one or more processing rules. Generally, a rule for processing data values of the dataset can include one or more data processing operations that are performed on the data values when the data values are in a field associated with a particular semantic label. The rule can include a single operation or a list of more than one operation. The semantic label 118 can indicate to the data processing system which rule(s) (e.g., of a library of rules) should be applied to the data values of a given data field for an application, or whether any rule should be applied to the data values of the given field. For example, the rule can include a data quality rule that imposes a data requirement on each data value of the given field. The data requirement can be a format requirement, range requirement for the value, and so forth. The rule can include a data masking rule requiring that a data value be transformed to a different format before downstream applications can process the data value. Many other types of rules are possible, as subsequently described.

The data processing device 102 is configured to receive data from the data dictionary 614 and the label index 610 for processing the input data 112. The data processing device 102 is configured to use the semantic labels 118 for one or more of several different applications. The data processing device 102 includes a data quality rule module 104 (also called a data quality rule module 104). The data quality rule module 104 is configured to generate data quality rules for fields of data records (e.g., of input data 112) based on the semantic label(s) associated with each of the fields. In an example, a first set of data quality rules can be automatically generated for (and used to process) a first field with a first semantic label. For example, if the first field is labeled as a social security number, the data quality rule module 104 can be configured to generate data quality rule model 104 can be configured to generate a first set of data quality rules configured to test whether values of that field are actually valid social security numbers. In another example, a second field can be labeled as a data of birth field. The data quality rule module 104 can be configured to generate a second, different set of data quality rules that are configured to test whether values of that second field are actually valid dates of birth (rather than other dates or other kinds of data). The data quality rule module 104 is described in further detail in relation to FIGS. 2A-3C.

The data processing device 102 includes a test dataset module 106. The test dataset module 106 is configured to generate test datasets for testing data processing applications. Generally, to test an application, realistic test data are used to ensure that all features of the application are functioning as intended. Generating test data that tests all functionality of the application can be difficult and time consuming, because there can be many processing permutations, case structures, etc. that need to be tested. Furthermore, test data should function in a similar way to real data in that it should comply with referential integrity and internal logical consistency. For example, links in the test data should point to valid data that is also testable. The test dataset module 106 is configured to ensure that test data satisfy these requirements. For example, the test dataset module 106 is configured to generate test data in which the test data are satisfy referential integrity (e.g., pointers point to valid fields), that the correct data are included (e.g., a social security number field is included in the test data if needed), that extraneous data are not included (e.g., fields that are not needed in the test data are excluded from the test data), and so forth. The test dataset module 106 is described in further detail with respect to FIGS. 4A-5B.

A data masking module 108 is configured to generate rules for masking data fields in the input data 112. Data masking can be used to ensure that sensitive data, such as personally identifiable information (PII), is masked such that the data is no longer representing real people or genuine entries in data records. For example, data masking can involve anonymizing values of the fields of a data record. Data masking can include encrypting values of particular fields. Numerous other methods for masking data are also possible, as subsequently described. The data masking module 106 is configured to mask fields using particular masking functions. The particular masking function for a field can be chosen based on the semantic label of the field. For example, the semantic label associated with a field can specify how the data are to be masked (e.g., which masking function or masking technique should be used for that field). Thus, the semantic label can specify not only that a field should be masked, but also how the field should be masked.

A dataset schema analysis module 110 is configured to identify relationships among fields of the input data 112 and from these relationships determine a schema of the input data 112. A schema indicates a structure of the input data 112. For example, a schema of the input data 112 can indicate key-value relationships among fields, field dependencies on other fields, value correlation between and among fields, and so forth. One or more of the other modules 104, 106, 108 of the data processing device 102 process input data 112 based on the identified schema, including generating or applying data quality rules, generating or applying data masking policies, and generating test datasets. In some implementations, the schema of the input data 112 is determined in parallel with the processes of the semantic discovery system 602. In some implementations, the semantic labels generated by the semantic discovery system 602 are used to determine the schema of the input data 112 by the dataset schema analysis module 110.

Generally, the data processing device 102 receives datasets from an input data store 112, and outputs processed data to an output data store 114. In some implementations, the input data store 112 and the output data store 114 are included in the same data store. In some implementations, the input data store 112 and the output data store 114 are databases. The datasets received by the data processing device 102 can include data records, data tables, or other data in which groups of one or more values are associated with a name or label. For example, the dataset can include one or more fields each including one or more values. Each field can include a field name. The field name can be a technical name, coded name, business term, numerical value, or any other value. In some implementations, the fields do not have field names. Generally, one or more of the fields of the input data 112 are associated with respective semantic labels. Each semantic label indicates what the syntactical or semantic meaning of the field is, as previously described.

The data processing system 100 includes a reference data store 116. The reference data store 116 stores data that are used by the data processing system 100 to operate the modules 104, 106, 108, and 110. For example, if data quality rules from a data quality rules library are needed by the data quality rule module 104, the data processing device 102 retrieves the data quality rules from the reference data store 116 based on criteria described below. The reference data store 116 stores information such as masking functions for use during data masking processes. The reference data store 116 can store the label index 610 and data dictionary database 614 data. The reference data store 116 can include an in-memory data store or a persistent data store. The reference data store 116 can be a single data store or a distributed network of data stores. Essentially, the reference data store 116 is a place to hold data for use in the various processes of the data processing system 100.

FIGS. 2A-7B are block diagrams each describing a data processing module of the data processing device 102 of FIG. 1. Turning to FIGS. 2A-3C, the data quality rule module 104 is configured to generate data quality rules for datasets or apply data quality rules to datasets (such as input data 112), using the semantic meanings of the fields of the datasets. The semantic meanings for the fields is determined by the semantic discovery system 602, as previously described in relation to FIG. 1, and as subsequently described in detail in relation to FIG. 8.

Figure 2A:
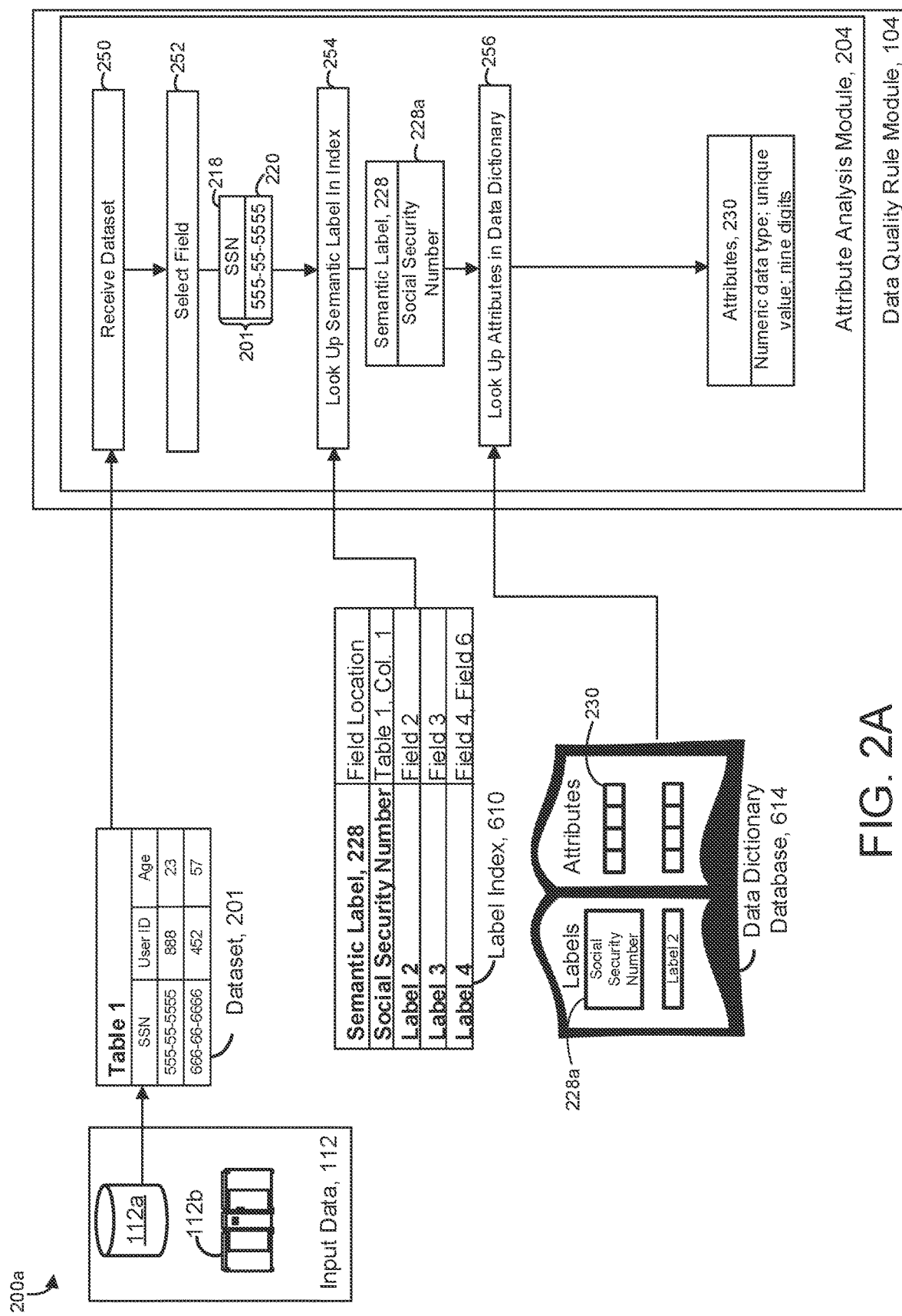
FIGS. 2A-7B are block diagrams each including an example data processing module of FIG. 1 for data quality rule processing.

FIG. 2A shows a process 200a executed by an attribute analysis module 204 of the data quality rule engine 104. The attribute analysis module 204 is configured to determine what attributes are associated with a field which has values being processed by the data quality rule module 104 so that one or more data quality rules can be generated by the module 104 for the field. The attribute analysis module 204 receives a dataset 201 that includes fields associated with attributes of the data dictionary 614 by the label index 610. As previously indicated, a semantic label 228 can associate the attributes and the fields, but an actual label is not required. For simplicity, subsequent examples include semantic labels to associate the semantic meaning indicated by the attributes with the fields, but in each of the subsequent examples, an actual label (e.g., descriptive word or term) is not required.

The attribute analysis module 204 determines what the attributes are for a given field for which data quality rules are to be generated or to which data quality rules are to be applied. The attribute analysis module 204 is configured to receive (250) the dataset 201. The attribute analysis module selects (252) a field of the dataset 201. In the example of FIG. 2A, the field 218 selected is named "SSN," though a field name is not required. The value 220 of the field "SSN" is "55-555-5555."

Once the field is selected, the attribute analysis module uses the label index 610 to look up (254) a semantic label 228 in the label index 610. In some implementations, a label is not received, but an entry identifier in the data dictionary database 614 (or some other indicator of which attributes relate to the selected field, without using a label). The attribute analysis module 204 performs a look up (256) to determine which attributes are related to the label 228a "Social Security Number." Here, attributes 230 are related to label 228a in the data dictionary database 614. The attributes 230 are then stored (e.g., in memory) for generation or application of data quality rules by a rule generation module 206 or a rule application module 208 of the data quality rule generation module 104.

Figure 2B:
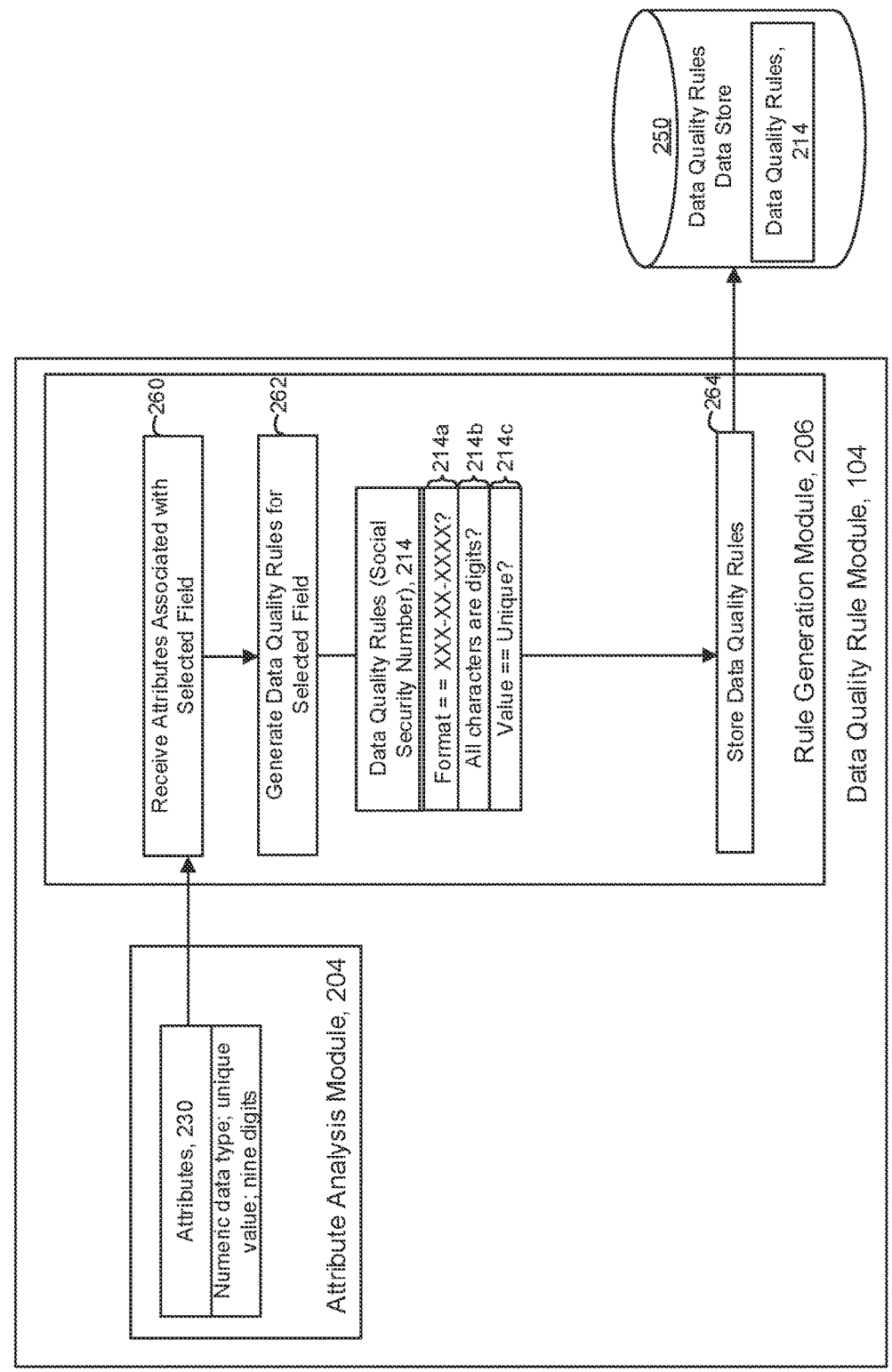

Turning to FIG. 2B, in a process 200b, the rule generation module 206 is configured to determine, based on the semantic meaning for a field (e.g., indicated by the attributes 230), one or more data quality rules for the field. For example, a particular attribute may indicate one or more rules that can apply to the selected field. In this context, the attributes 230 can indicate sets or ranges of allowed values, relationships of the values of the field to values of one or more other fields (e.g., always greater than, always less than, equal to, a function of, and so forth), data type, expected value length, or other characteristics of the values of the field. For example, as subsequently described, the attributes can indicate what values are permitted in the field and what values are not permitted in the field. For example, a given range indicated in the attributes associated with a label of a field can also be a data quality rule for that field. However, the attributes associated with the field and the rules being generated for the field do not necessarily match. For example, a data quality rule for the field can require that there are no duplicative values or no empty values, while the attributes 230 need not indicate this rule. Conversely, the attributes may indicate that the selected field conform to a particular requirement, but the data quality rules being generated need not enforce this requirement.

The rule generation module 206 is configured to receive (260) the attributes 230 associated with the field. The rule generation is configured to generate (262) data quality rules for the selected field based on the attributes as previously described. Any number of data quality rules can be generated using any combination of the attributes 230. The rules can enforce a requirement for each value of the field independently from any other fields or values of the dataset 201. For example, a data quality rule 214a can require that a format of a value of the field associated with the label "Social Security Number" have the format "XXX-XX-XXXX," where X can be any digit from 0-9. This requirement is based on each individual value and requires no further analysis to enforce. In another example, the rule 214b can check the type of each character in the value, ensuring that all the X values are indeed digits from 0-9, rather than other characters. In another example, the data quality rule can require a check on the entire selected field. For example, data quality rule 214c requires that each value in the selected field be unique. This requires checking the values in the selected field in addition to the currently processed value to determine whether each value is unique.

Other examples of data quality rules are possible. In some examples, a rule to be used to characterize the quality of a set of data can indicate an allowable attribute or a prohibited attribute of a profile of the data records in the set of data. An attribute of a profile can be a value or range of values. A rule indicating an allowable attribute of a profile is satisfied when the profile includes the allowable attribute. An example of an allowable attribute for a field can be allowable maximum and minimum values for that field; if the average value for the field falls between the allowable maximum and minimum values, the rule is satisfied. A rule indicating a prohibited attribute of a profile is satisfied as long as the profile does not include the prohibited attribute. An example of a prohibited attribute for a field can be a list of values that are prohibited for that field; if the field includes any of the prohibited values, the rule is not satisfied.

A data quality rule can indicate an allowable deviation between a value or values of a field and a profile for the field. A deviation between the profile and the values of the field that is greater than the allowable deviation indicated by the corresponding rule can be an indication of a data quality issue in the dataset, and thus an indication that the dataset is a possible root cause of an existing or potential data quality issue in a downstream set of data. In some examples, the allowable deviation can be specified as a range of values, such as a maximum allowable value and a minimum allowable value. In some examples, the allowable deviation can be specified as a standard deviation from a single value, which can be an average value (e.g., a mean or median of values in past datasets).

In some examples, a rule to be used to characterize the quality of a set of data can indicate allowed or prohibited characteristics of the value in each of one or more fields of a data record, such as based on the validity of the value in a field. A rule indicating an allowed characteristic for a field is satisfied when the value in the field meets the allowed characteristic. A rule indicating a prohibited characteristic for a field is satisfied as long as the value in the field does not meet the prohibited characteristic. A value that satisfies a rule is sometimes referred to as a valid value; a value that does not satisfy a rule is sometimes referred to as an invalid value. Various characteristics of values in the fields can be indicated as allowed or prohibited characteristics by the rule. An example rule can indicate allowed or prohibited characteristics of the content of a field, such as an allowed or prohibited range of values, an allowable maximum value, an allowable minimum value, or a list of one or more particular values that are allowed or prohibited. For instance, a birth year field having a value less than 1900 or greater than 2016 may be considered invalid. An example rule can indicate allowed or prohibited characteristics of the data type of a field. An example rule can indicate a whether the absence of a value (or the presence of a NULL) in a certain field is allowed or prohibited. For instance, a last name field including a string value (e.g., "Smith") may be considered valid, while a last name field that is blank or that includes a numerical value may be considered invalid. An example rule can indicate an allowed or prohibited relationship among two or more fields in the same data record. For instance, a rule may specify a list of values for a ZIP field that correspond to each possible value for a state field and may specify that any combination of values for the ZIP and state fields that is not supported by the list is invalid.

In some examples, a rule can be generated based on an analysis of historical data. A rule generated by the rule generation module 206 can indicate an allowable attribute or a prohibited attribute of a profile of the data records in a set of data. For instance, a rule for a profile can be indicative of an allowable deviation between the profile of a field of a particular set of data and a determined historical profile of the field of the set of data. The historical profile for a dataset can be based on historical data; for instance, the historical profile can be a profile of the same dataset from a previous day, an average profile of the same dataset from multiple previous days (e.g., over the past week or month), a lifetime average profile of the same dataset. More generally, the profile can retain a wide variety of reference information to take advantage of various kinds of statistical analyses. For example, the profile can include information about standard deviations or other indications of a distribution of values.

For purposes of the examples below, and without limiting the generality of this application, the profile can include a numerical average of prior datasets, and possibly also a standard deviation.

A generated rule can indicate a determined allowed or prohibited characteristic of the value in a field of a data record. In an example, a generated rule for a field can indicate an allowable maximum or minimum value for the field based on an analysis of historical maximum or minimum values for the field. In an example, a generated rule for a field can indicate a list of allowed values for a field based on an analysis of values that have occurred previously for the field.

In some examples, machine learning techniques are employed to generate the data quality rules. For instance, data can be analyzed over a learning period in order for user preferences or applications as to which characteristics affect the data quality for that application and thus require data quality rules for enforcement of those characteristics. For example, if an application often fails because values of the field are in an incorrect format, the rule generation module generates a rule to enforce a particular format. If the application fails because numerical values are out of an acceptable range, the rule generation module 206 generates a data quality rule to enforce a particular range of values for the field. Other such examples are possible. The learning period can be a specified period of time or can be an amount of time until an average or expected value converges to a stable value.

The rule generation module 206 is configured to generate one or more data quality rules based on expected characteristics of data records to be processed by the system. In a specific example, the source data are credit card transaction records for transactions occurring in the United States. The source data are streaming data that are processed in one-hour increments. Based on the attributes 230 identified for the field, and data from an application indicating operations to be performed when processing the credit card transaction records, the user can identify the transaction identifier field, the card identifier field, the state field, the date field, and the amount field as critical data elements to be profiled.

In the specific example in which the source data are credit card transaction records, the rule generation module 206 receives attributes indicating that there are only fifty allowable values for the state field. The rule generation module 206 can create a rule that causes an alert flag to be used if the profile of the set of source data identifies more than fifty values in the state field, regardless of the standard deviation of the profile of the set of source data relative to the reference. The rule generation module 206 can receive an attribute indicating that only credit card transaction records for transactions completed on the same day as the processing should be present in the set of source data. The rule generation module 206 can create a rule that causes an alert message to be sent if any source data record has a date that does not match the date of the processing.

In some examples, a rule generation module 206 can specify one or more rules being generated through a user interface. Through the user interface, a user can provide feedback for a rule for one or more fields or can approve a pre-populated default rule for a field. Further description of a user interface can be found in U.S. application Ser. No. 13/653,995, filed Oct. 17, 2012, the contents of which are incorporated here by reference in their entirety. Other implementations of the user interface are also possible.

In some examples, if a possible data quality issue is detected in a set of data, such as in a new version of a set of reference data or in a set of source data, an identifier of the set of data having the possible data quality issue is placed on a list of root cause datasets stored in a database. If a data quality issue with a set of output data is later detected, the database can be queried to identify the upstream data lineage elements for the set of output data and to determine which, if any, of those upstream data lineage elements are included on the list of root cause datasets.

In some examples, if a possible data quality issue is detected in a set of data, such as a new version of a set of reference data or in a set of source data, a user notification can be enabled. In some examples, an alert flag can be stored to indicate the data quality issue. For instance, if a possible data quality issue is detected in a new version of a set of reference data, an alert flag can be stored in conjunction with the profile data for the new version of the reference data. If a possible data quality issue is detected in the set of source data, an alert flag can be stored in conjunction with the profile data for that set of source data. In some examples, an alert message can be communicated to a user to indicate the existence of a possible data quality issue. The alert message can be, for instance, as a message, an icon, or a pop-up window on a user interface; as an email or short message service (SMS) message; or in another form.

In some examples, the rules can specify one or more threshold deviations from the profile at which an alert flag or alert message is used. For instance, if the deviation between a profile of a current set of data and a profile for that set of data is small, such as between one and two standard deviations, the alert flag can be stored; and if the deviation is greater than two standard deviations, the alert message can be communicated. The threshold deviation can be specific to each set of source data and reference data.

In some examples, such as if the deviation is severe, e.g., more than three standard deviations from the profile, further processing by the data processing system can be stopped until a user intervenes. For instance, any further processing that will be affected by the source data or reference data having the severe deviation is halted. The transforms to be halted can be identified by the data that references the data lineage elements that are downstream of the affected source or reference data.

In some examples, the profile data are automatically determined. For instance, the profile data for a given set of data can be automatically updated as a running historical average of past profile data for that set of data, e.g., by recalculating the profile data whenever new profile data for that set of data are determined. In some examples, a user can supply initial profile data, e.g., by profiling a set of data having desired characteristics.

Continuing with FIG. 2B, the data quality rules 214a-c can be generated once and associated with a particular semantic label for later reuse. Not all of the constraints indicated by the attributes 230 need to be enforced as explicit data quality rules 214, though this could be done if desired. Rather, a set of the data quality rules 214 that enforce the constraints can be generated as needed for a given application. For example, an attribute of the semantic label can indicate that all data of the field having the semantic label is of length=9. The data quality rule associated with the attribute can require that the length of the data values of the field are each exactly 9. The length requirement can be specified in the profile 216. An associated data quality rule can be generated from this information. For example, the data quality rules 214 can include a data quality rule specifying a length requirement1. The rule generation module can generate, from this available rule and after consulting the profile 216, that a data quality rule requiring a length of exactly 9 digits.

The rule generation module 206 generates at least one data quality rule for the field. The data quality rule that is generated can be unique to the field or common to more than one field. The data quality rule can be indicative of one or more of an allowable deviation between a feature for of a value in the field of the dataset and the one or more features included in the profile for the field, one or more allowable values in the field, and one or more prohibited values in the field.

As previously indicated, the data quality rule module 104 is configured to automatically generate data quality rules using the attribute(s) associated with the semantic label 228. To do this, the rule generation module 206 transforms one or more of the attributes into logical rules. For example, if an attribute indicates that all values of the field are between 1 and 100, a data quality rule can be generated that requires all values are between 1 and 100. However, such a data quality rule need not necessarily be generated. For example, another attribute associated with semantic label 228 may indicate that the final digit of each value of the field end in 7. As such, a data quality rule can be generated requiring both that the value be between 1 and 100 and end in a 7. These can also be expressed as two different rules. In another example, the attributes may indicate a particular format for a value, such as that the value has a format like ###-##-####, which is the format of a social security number. The data quality rule generator may generate a data quality rule requiring values to comply with this exact format, a portion thereof, or a common variation (e.g., nine digits without any dashes).

The semantic label 228 may indicate a relationship of the values of the field to values of another field. The rule generation module 206 can generate data quality rules based on these relationships. For example, if the field is a first field, and the dataset comprises a second field, the rule generation module can be configured to generate data quality rule for the first field based on the relationship between the second field and the first field. For example, the second field may be associated with a semantic label indicating that the field is populated with user names. The data quality rule can require that the valid name in the second field be associated with each value in the first field for the first field to pass the data quality test. A combination of rules 214a-c can be used. For example, a rule can be generated specifying that, for field SSN, IF Format=###-##-####, AND the value of each social security number 218 of the SSN field 220 is unique, the data quality rule Output=PASS. This combines two of the three proposed rules (which can also be called constraints), including constraints 214a and 214c.

In some implementations, the rules can be based on how the data values of a field change over time. For example, a profile for the field can be selected based on a historical trend for values in the field. In another example, the profile for the field is determined based on identifying a historical average of a value in the field.

The rule generation module 206 can generate data for requesting approval of the data quality rule. For example, a user can approve or deny rules in a user interface. The rule generation module 206 can approve the data quality rule for application in response to obtaining approval data indicative of approval of the data quality rule. In some implementations, no approval data is needed to apply the rule. Once the rule generation module 206 generates the rules (e.g., rules 214a-c), the rules 214 are stored (264) in a data store, such as a data quality rules data store 250.

Figure 2C:
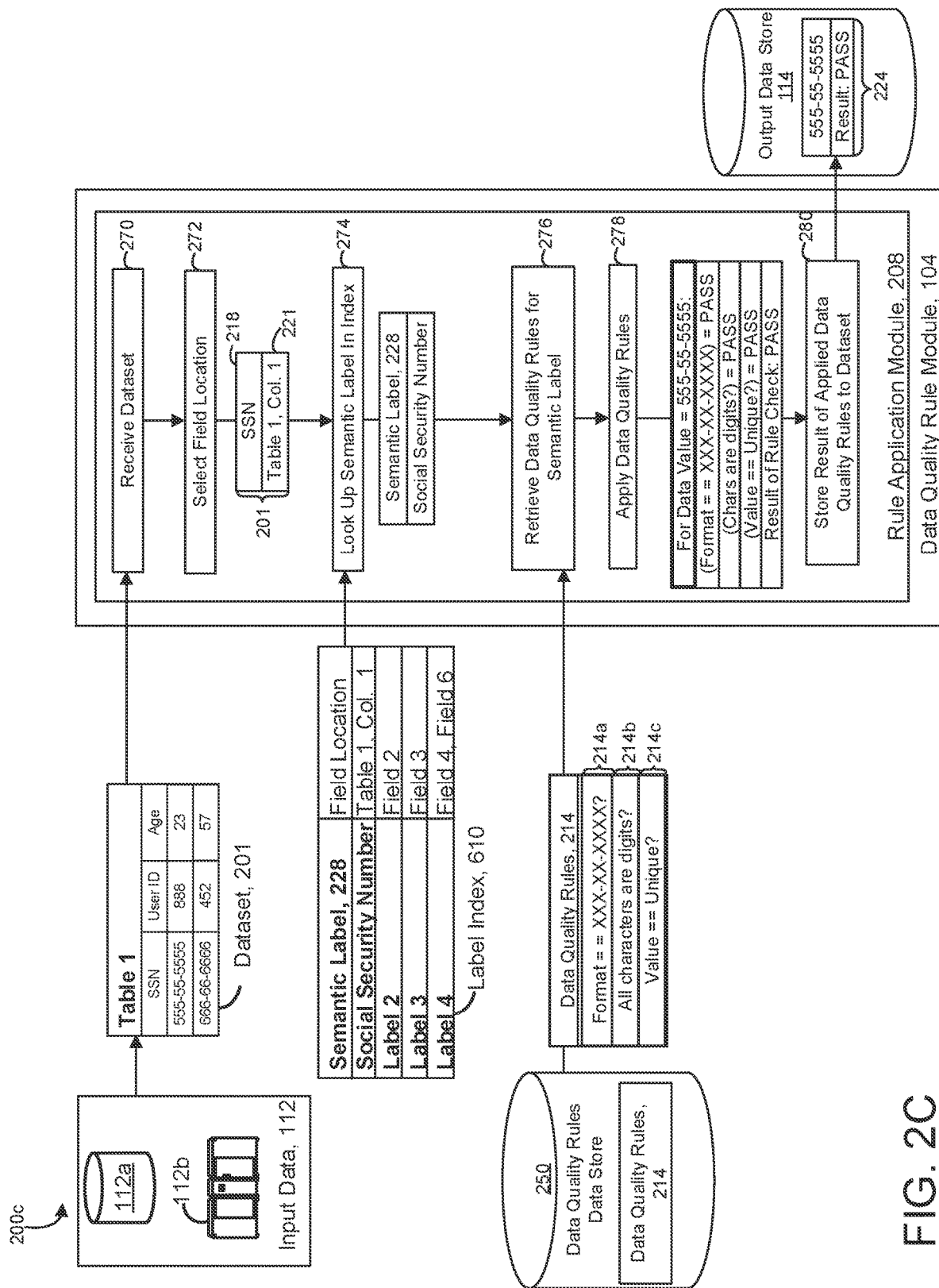

Turning to FIG. 2C, in a process 200c, a rule application module 208 is configured to apply the generated data quality rules 214 to any data 112 received based on the semantic meaning associated with the received data, such as by the attributes 230 associated with the fields using the semantic label 228.

The rule application module 208 is configured to receive (270) the dataset 201. The rule application selects (272) a field of the dataset 201, such as field 218 named "SSN" having a location 221 in the dataset of table 1, column 1. The rule application module 208 references (274) the label index 610 and finds which rules are associated with the field at table 1, column 1 in the dataset 201. Here, a semantic label 228 "Social Security Number" is used to represent the field. The rule application module 208 accesses (276) the data quality rules data store 250 and retrieves the data quality rules 214 for the field labeled "Social Security Number." The rule application module 208 applies (278) the data quality rules to the values of the field 218. In an example, a value 555-55-5555 passes a format rule, a character limit rule, and a unique value rule. The result of passing all of rules 214a-c is a PASS. The application module 208 stores (280) the result 224 of the data quality rule application in an output data store 114.

The data quality rules generated for a field associated with a label 228 can be applied to any field associated with the same label, either in a second instance of dataset 201 or in a new, different dataset. For example, the label 228 Social Security Number labels the field for which the rule generation module 206 has generated one or more data quality rules. The generated data quality rules can be applied to any field with the same label 228 because the fields have the same semantic meaning. This can also be the case for different fields labeled with the label 228 across datasets. For example, if a new field in a new dataset has the label 228 Social Security Number, the data quality rules generated for data record 202 are still applicable to that new field in the new dataset.

Figure 3A:
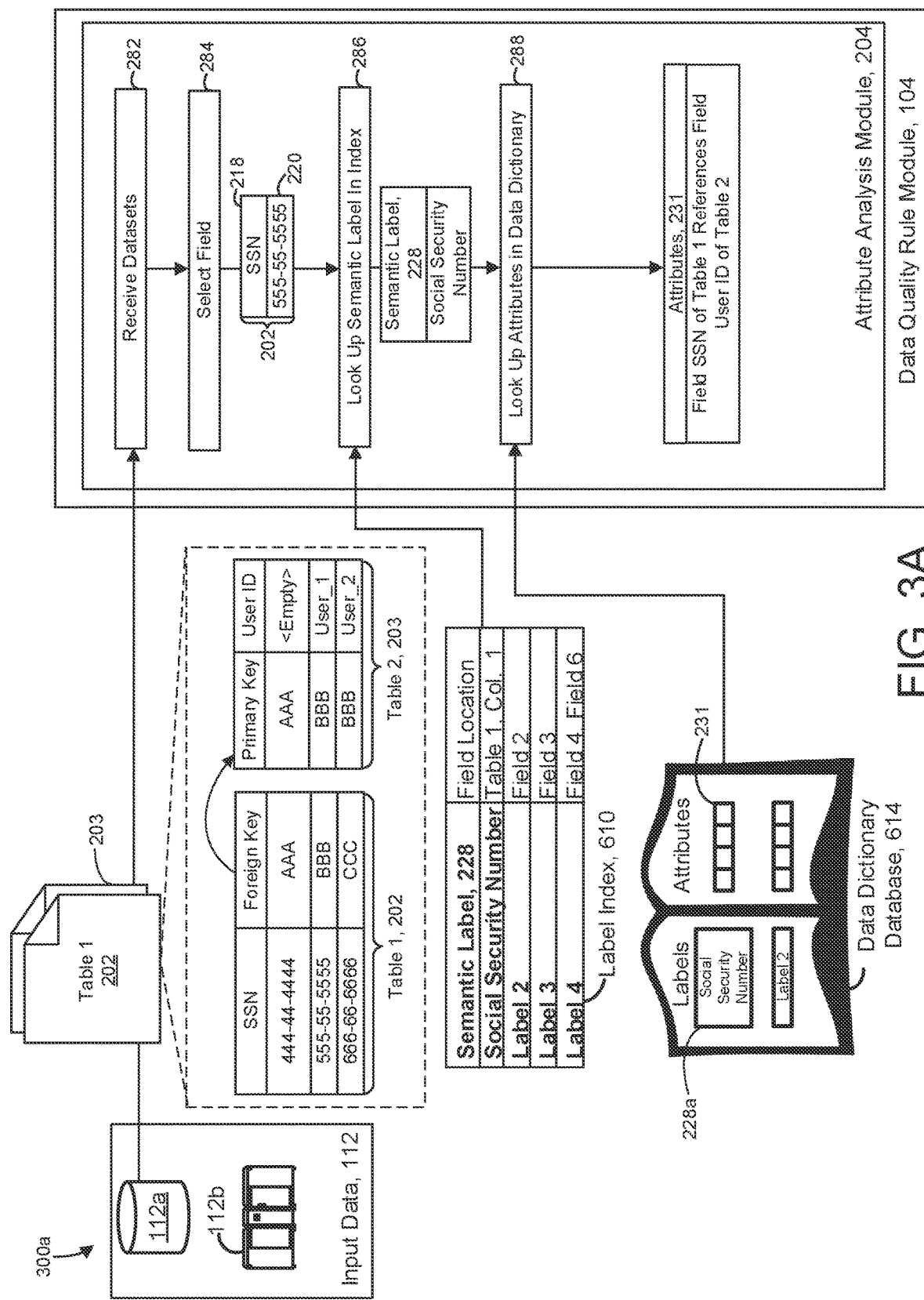

This above examples shows rules generated from a single field analysis. It is also possible to generate rules based on a multi-table (e.g., multi-field) analysis. Turning to FIG. 3A, in an aspect, a data quality rule can be generated based on a relationship between multiple fields or data records, such as data records 202 and 203. The relationship between fields can be indicative of a dependency of a value of the second field on a value of the first field or the value of the first field on the value of the second field. In an aspect, the relationship can be indicative of a correlation between a value of the first field and a value of the second field. In some examples, the data quality rule module 104 validates the relationship between or among fields by obtaining validation data confirming the relationship. The validation data can be a user input or based on the attributes of the semantic labels of the related fields. For example, during rule generation, the relationship can be validated for a threshold number of values for the first field and the second field to test the generated rule. For example, if the first field and the second field each comprises numeric values, determining that the relationship exists between the first field and the second field can include determining a numerical function that relates values of the first field to values of the second field. In some implementations, the data quality rule generated can require that one or more allowable values correspond to values that satisfy a numerical function, and wherein the one or more prohibited values correspond to values that do not satisfy the numerical function.

In a similar process 300a as the process 200a described in relation to FIG. 2A, the attribute analysis module 204 determines what the attributes are for a given field, either for which data quality rules are to be generated or to which data quality rules are to be applied. The attribute analysis module 204 is configured to receive (282) the dataset 201. The attribute analysis module selects (284) a field of the dataset 201. In the example of FIG. 3A, the field 218 selected is named "SSN," though a field name is not required. The value 220 of the field "SSN" is "55-555-5555."

Once the field is selected, the attribute analysis module uses the label index 610 to look up (286) a semantic label 228 in the label index 610. In some implementations, a label is not received, but an entry identifier in the data dictionary database 614 (or some other indicator of which attributes relate to the selected field, without using a label). The attribute analysis module 204 performs a look up (288) to determine which attributes are related to the label 228a "Social Security Number." Here, attributes 230 are related to label 228a in the data dictionary database 614. The attributes 231 are then stored (e.g., in memory) for generation or application of data quality rules by a rule generation module 206 or a rule application module 208 of the data quality rule generation module 104. In this example, the attributes 231 indicate that the field 218 named "SSN" of table 1 (e.g., of record 202) references a field named "USER ID" of table 2 (in record 203). The data quality rule generation module 206 can use this information (which can be discovered during schema analysis, described in relation to FIGS. 7A-7B) to generate data quality rules based on the relationships among fields of the records 202, 203.

Figure 3B:
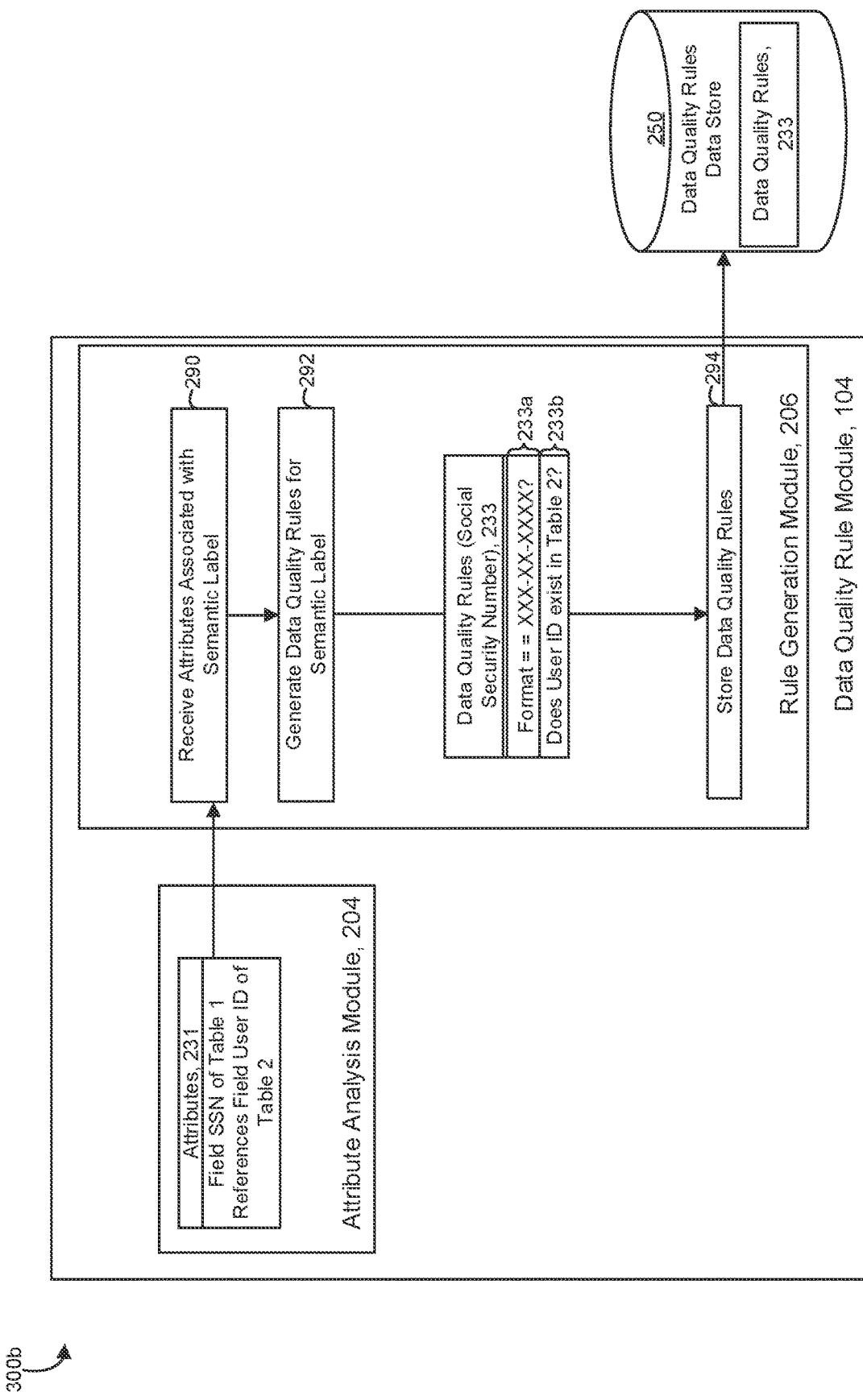

FIG. 3B shows a process 300b for generating data quality rules by the module 206, similar to process 200b of FIG. 2B. A data quality rule can be configured by the rule generation module 206 to enforce a constraint on a value of the second field (e.g., of record 201) based on a value of the first field (e.g., of record 203). For example, determining that the relationship exists between the first field and the second field can include determining that a value of the second field comprises a key value referenced by a value of the first field. The data quality rule generation module 206 is configured to generate a data quality rule that is configured to require that each value of the second field is a valid key value.

Figure 7A:
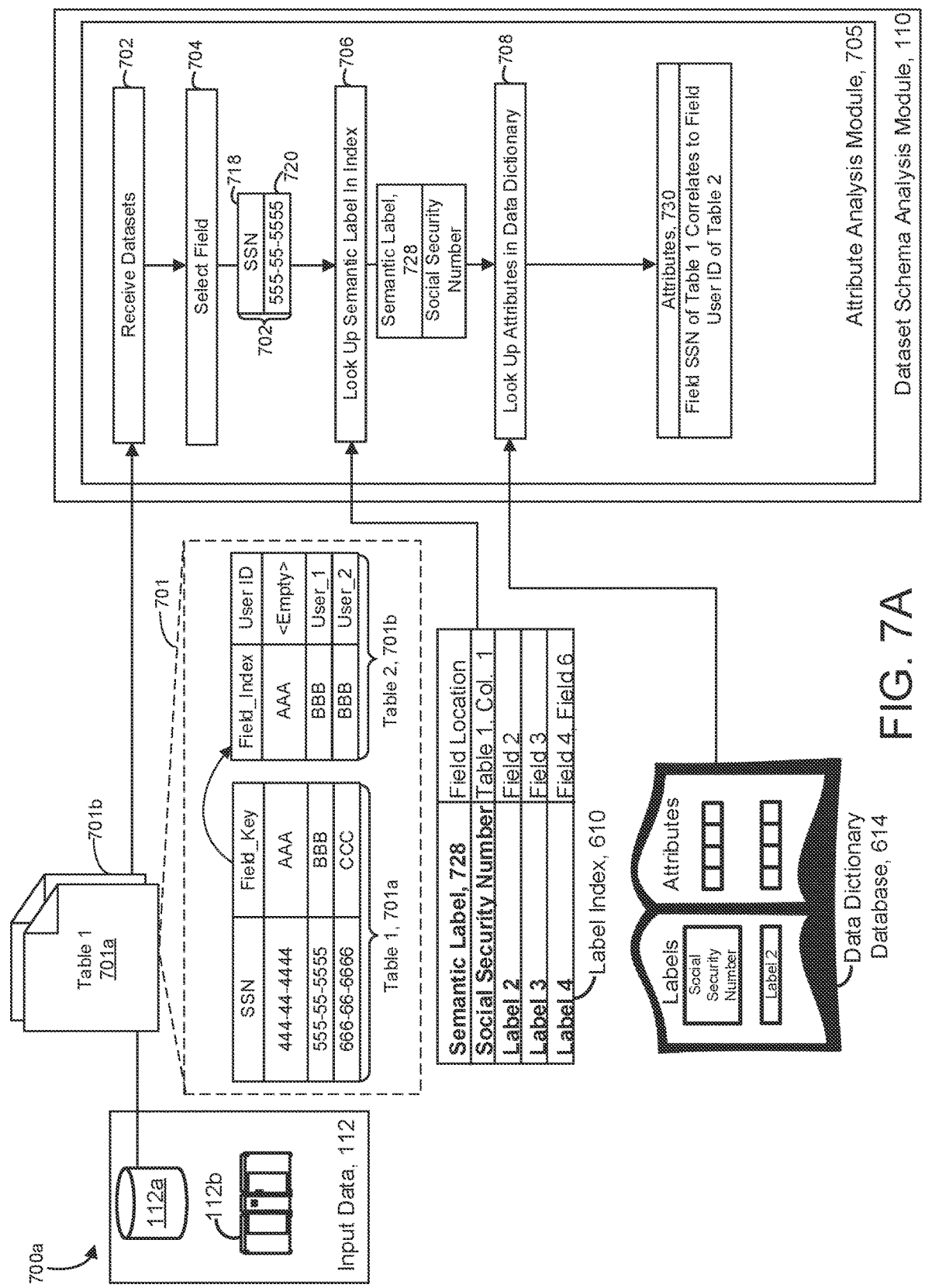
Figure 7B:
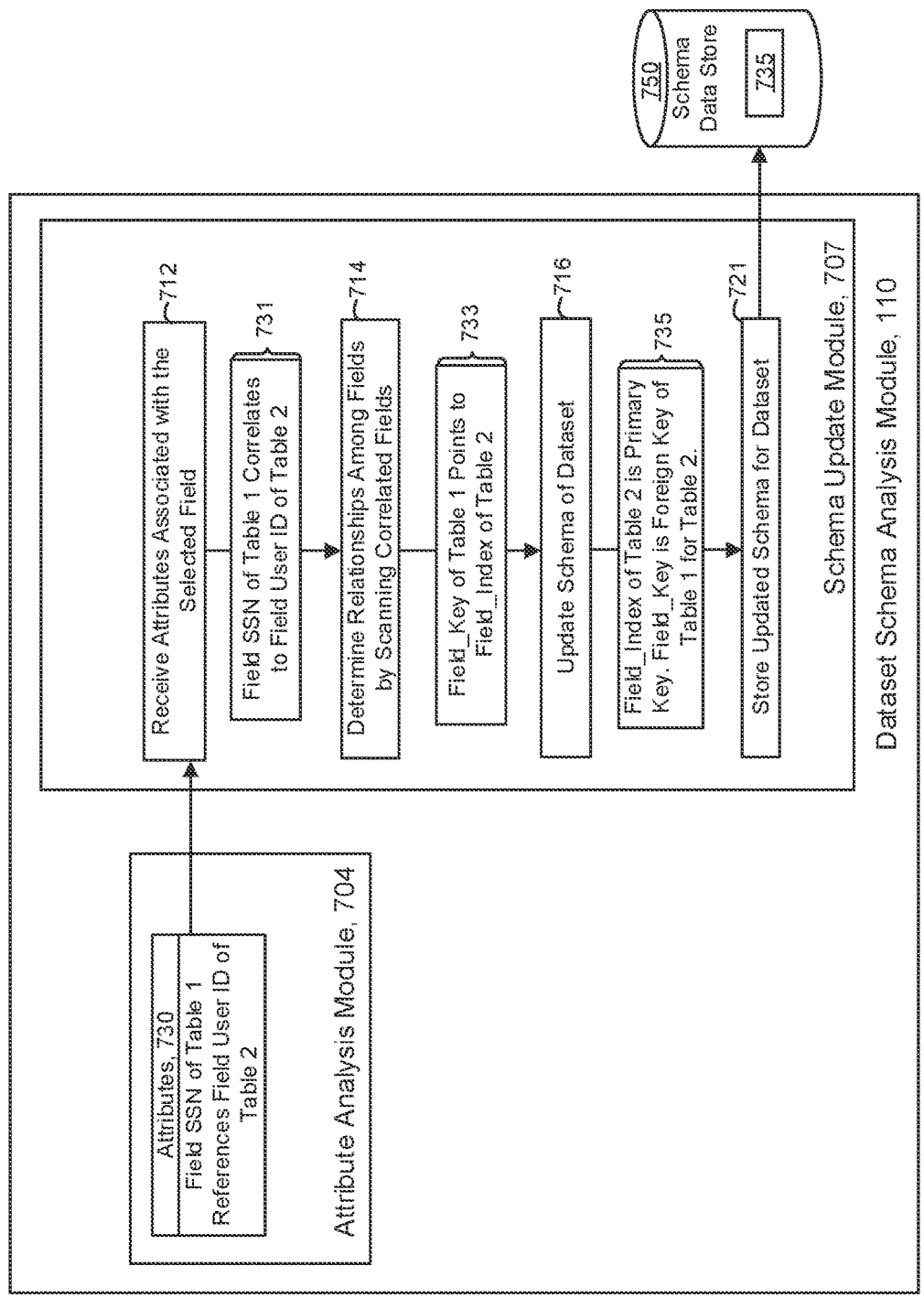

The rule generation module 206 can be configured to determine that the relationship exists between the first field and the second field by an output of the semantic discovery process executed by system 602, or by the schema analysis described in relation to FIGS. 7A-7B. In an example, the relationship among fields of records 202, 203 can be determined using at least one classifier configured by a machine learning process. For example, one or more tests (subsequently described) that are used to determine the semantic labels for fields can also determine the relationships among the fields. The relationships among the fields are included in the attributes 231 associated with the semantic labels for each of the fields. For example, the attributes can indicate that determining that the semantic label of the field indicates that the field includes primary key values for the dataset. In an example, the rule generation module 206 configures the data quality rule to require that the primary key values are each unique in the field.

Continuing with FIG. 3B, an example data quality rule 233 generated by the rule generation module 206 using multi-table analysis is shown. As previously described the attributes 231 include a multi-table constraint, unlike single-field constraints described in relation to FIGS. 2A-2C. Multiple records 202 and 203 are analyzed by the attribute analysis module 204 to determine the multi-table attributes 231 relevant to the records 202, 203. In some implementations, the schema analysis performed by the dataset schema analysis module 110 (subsequently described in relation to FIGS. 7A-7B) is used to determine the multi-table attributes 231. Like attributes 230, multi-table attributes 231 can be determined during the semantic discovery process described in relation to FIG. 8. The rule generation module 206 uses the multi-table attributes 231 in similar way as it uses the attributes 230 described previously with respect to FIG. 2A.

The multi-table constraints (in this example, attribute 231) are found by the rule generation module 206. The multi-table constraints can include any constraint applying to multiple fields. From the multi-table constraint, which is determined from the multi-table attributes 231, the rule generation module 206 can be configured to generate a data quality rule 233b that checks the relationships between and among multiple fields. Here, multi-table attributes 231 show that field SSN references field User ID. The rule generation module 206 generates a data quality rule 233b. For example, data quality rule 233b checks to determine whether a corresponding value exists (for each value of the selected field) in a USER ID field that is related to the selected field. This data quality rule 233b requires determining that the corresponding field USER ID is related to the selected field and that each value has a corresponding existing value in the USER ID field. If no value exists in the field User ID, the data quality rule 233 for the field SSN is failed.

This example rule only checks the existence of a value in the related field. However, more complex multi-table data quality rules are possible. For example, the rule generation module 206, for each value in the field SNN, can check to see whether a valid corresponding user ID exists in the User ID field. This can be done by checking data quality rules associated with the field User ID, such as that the ID is unique, within a given numerical range, and so forth. If any of the data quality rules applying to the User ID field are failed, the data quality rule for the field SSN is also failed in this example.

Figure 3C:
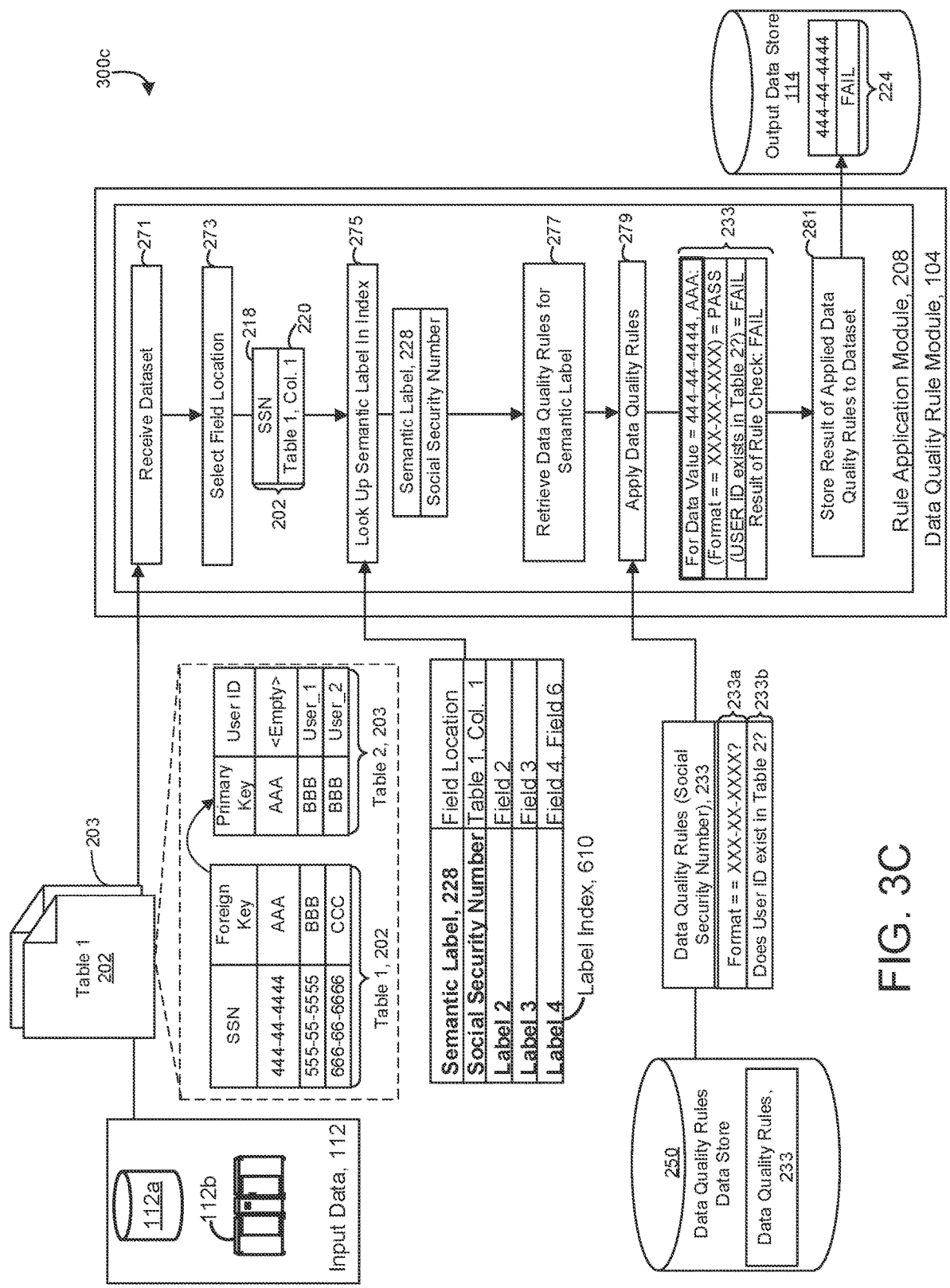

In FIG. 3C, a process 300c for application of a multi-filed data quality rule 233b is shown. For the value of the SSN field including 555-55-5555, a check is performed on the field User ID by the rule application module 208. The rule application module 208 is configured to receive (271) the record 202 including table 1. The rule application selects (273) a field of the datasets 202-203, such as field 218 named "SSN" having a location 221 in the dataset of table 1, column 1. The rule application module 208 references (275) the label index 610 and finds which rules are associated with the field at table 1, column 1 in the dataset 201. Here, a semantic label 228 "Social Security Number" is used to represent the field. The rule application module 208 accesses (277) the data quality rules data store 250 and retrieves the data quality rules 214 for the field labeled "Social Security Number." The rule application module 208 applies (279) the data quality rules to the values of the field 218. In an example, a value 555-55-5555 passes a format rule 233a, a character limit rule, and a unique value rule.

When applying the second data quality rule 233b that includes a multi-field requirement, the rule application module 208 access the second field and checks that field in order to apply the rule 233b. In this example, because the value for the corresponding User ID field in table 2 of data record 203 is <Empty>, showing that no User ID exists, the rule 233b is failed. Thus, although field 202 passed all the single field data quality rules, it has failed a multi-table data quality rule 233b. This can show a user how a system is failing data quality checks more clearly than simply checking each individual field. The result of passing all of rules 233*a-b-c* is a FAIL. The application module 208 stores (281) the result 224 of the data quality rule application in an output data store 114.

The data quality rules generated for a field associated with a label 228 can be applied to any field associated with the same label, either in a second instance of dataset 201 or in a new, different dataset. For example, the label 228 Social Security Number labels the field for which the rule generation module 206 has generated one or more data quality rules. The generated data quality rules can be applied to any field with the same label 228 because the fields have the same semantic meaning. This can also be the case for different fields labeled with the label 228 across datasets. For example, if a new field in a new dataset has the label 228 Social Security Number, the data quality rules generated for data record 202 are still applicable to that new field in the new dataset.

As previously described, other data quality rules can be generated from the attributes 231 associated with the fields. For example, an attribute can indicate that a value is based on values of a corresponding field, such as at least one of an average of the values in the field, a maximum length of the values, a minimum length of the values, a data type of the values, and a format of the values. For example, one or more allowable values or prohibited values in the field are associated with the field name that labels the field. For example, one or more allowable values or prohibited values in the field are determined based on a value in a second field in the dataset, the second field being related to the first field of the dataset. For example, one or more allowable values or prohibited values are based on a combination of the value in the second field and the values in the first field.

Figure 4A:
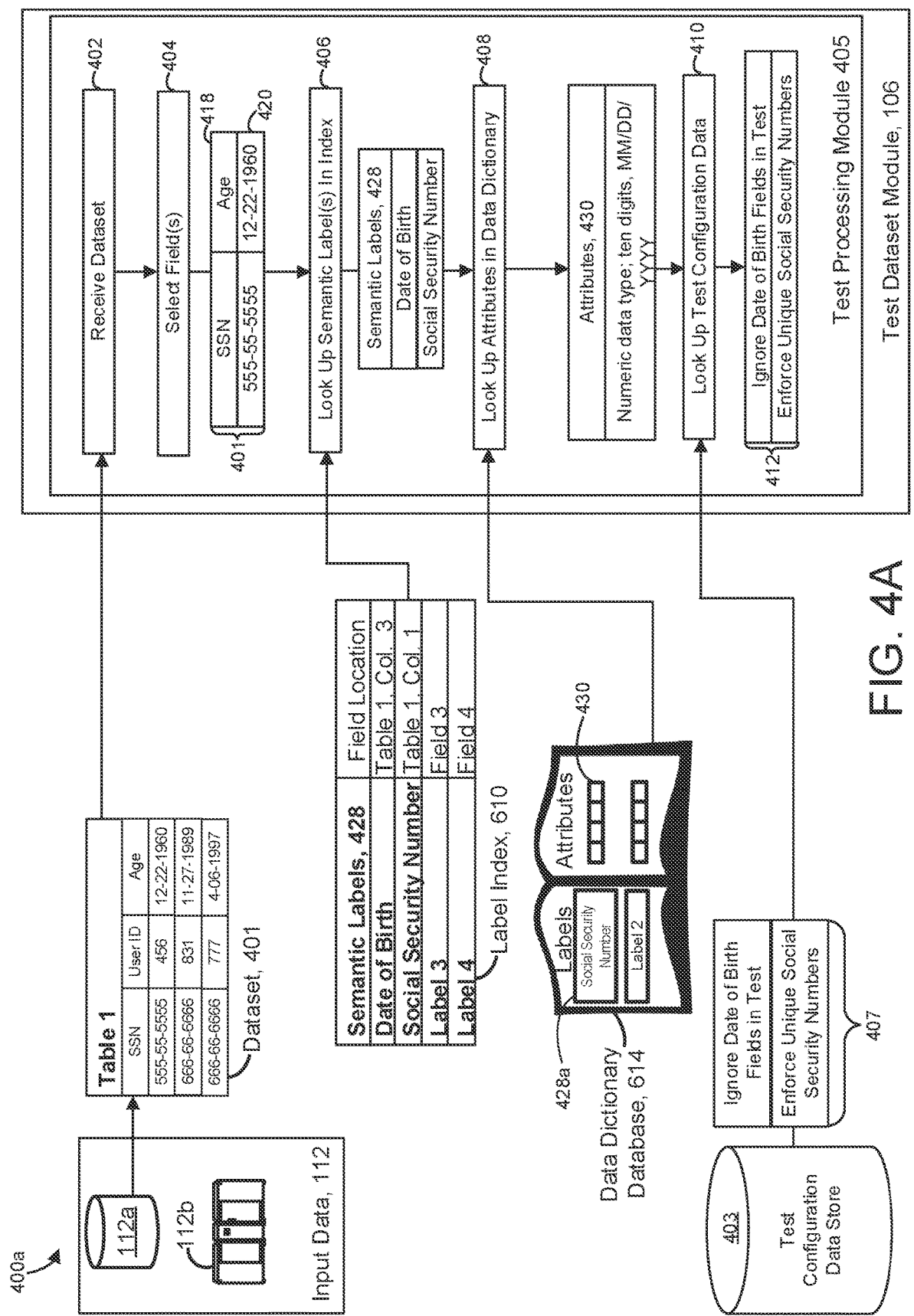
Figure 4B:
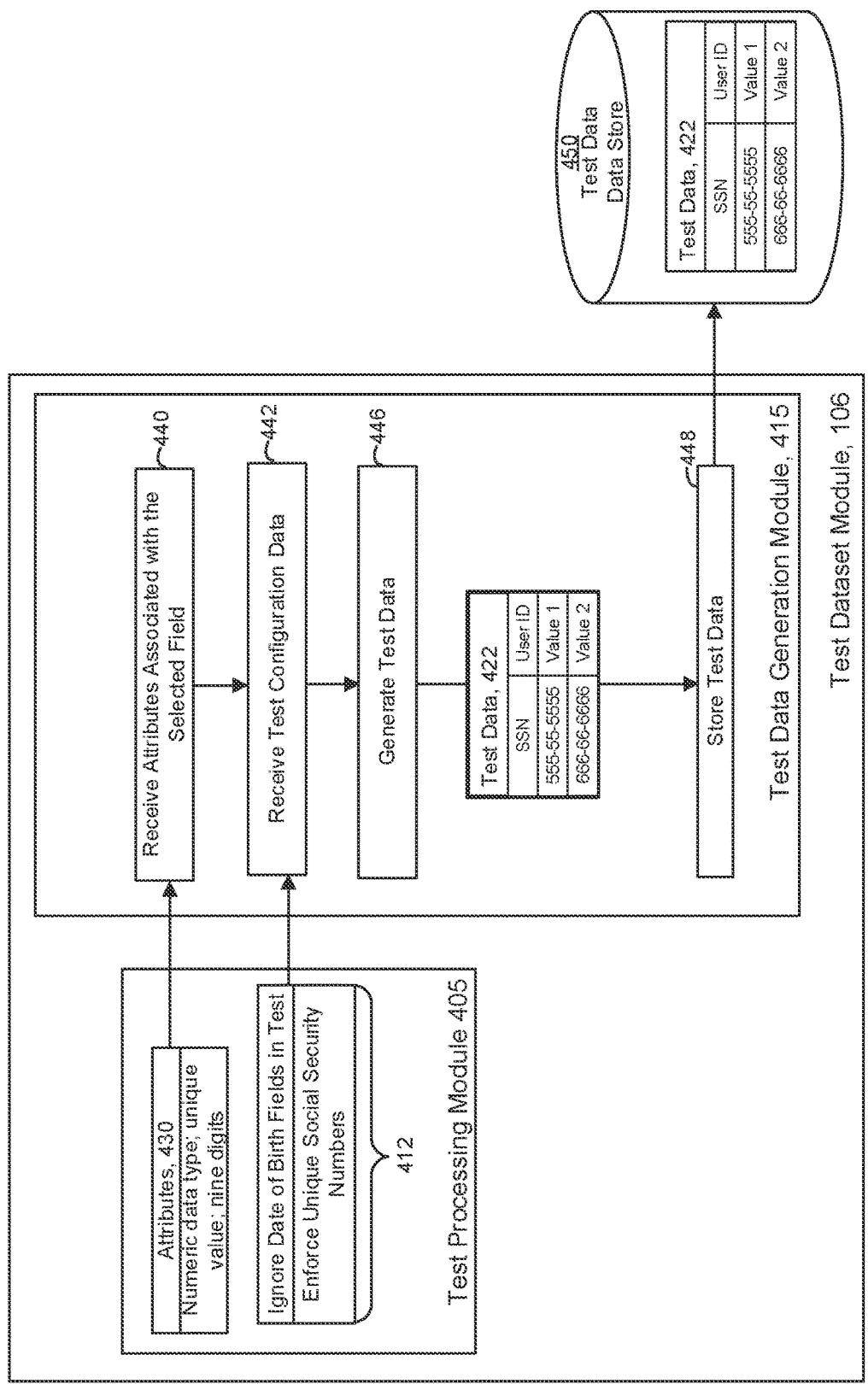

FIGS. 4A-4B show processes 400*a* and 400*b* for generating test data using the result of the semantic discovery process of the system 602. The test data are generated by the test dataset module 106. The test dataset module 106 includes test processing module 304 and a test data generation module 306.

FIG. 4A shows a test processing module 405 that is configured to generate test data from datasets (e.g., dataset 401) for testing logic of an application using the semantic meaning for fields of the datasets. The semantic meaning is represented by attributes 430 and in some aspects a semantic label, as described previously. The test dataset module 106 is configured to generate a set of test data for an application. The test data is generated such that it represents real data to be processed by the application, tests as much functionality of the application as possible (e.g., all functionality of the application), and so that the test data is valid (e.g., all keys are valid, fields include valid values, and so forth). The selection of fields to include in the test data, and the validation of the test data, can be performed based on the semantic meaning of each of the fields of the dataset 401.

Generally, to generate test data, the test dataset module 106 receives (402) a dataset 401 that includes fields that are labeled with the semantic labels (or otherwise associated with attributes 430 that indicate a semantic meaning for each of the fields of the dataset 401). In this example, the test processing module 405 selects (404) one or more fields of the dataset 401, such as a field 418 named "SSN" that includes a value 420 of "Dec. 22, 1960." The test processing module 405 performs a look up (406) of the semantic labels 428 in index 610. In response to retrieving the semantic labels 428, the label 428*a* is found as labeling field 418. The attributes 430 of the label 428*a* are received (408) by the test processing module 405. The attributes 430 indicate that the field 418 includes numeric characters including 10 digits and a MM/DD/YYYY format.

Once the attributes 430 are received, the test processing module 405 retrieves (410) test configuration data 407 from a test configuration data store 403. The test configuration data store 403 can be associated with an application to be tested. The test configuration 407 includes a specification of requirements for the test data to be generated. For example, the test configuration 407 can include a list of fields to ignore. The fields to ignore can be based on the semantic meaning of the fields, as the application may not have data indicating the field names in advance of receiving the dataset 401. For example, when generating the test configuration 407, a user can specify that social security fields should be ignored for the test. The test dataset module 106 can determine which fields represent social security numbers and remove those from the teste data. This can reduce a data footprint of the test data, saving storage space. In another example, the test configuration data 407 can indicate that social security numbers in the test data should be unique. The test dataset module 106 can find which fields of the dataset 401 represent social security numbers and remove duplicate entries in the field to reduce the test data size. In another example, the test configuration data 407 may indicate which fields should be key values and what fields they should point to in other datasets. The test dataset module 106 can enforce that structure in the generated test data, as subsequently described. Any other similar requirements can be included in the test configuration data 407, and can include schema requirements, data quality requirements, field inclusion requirements, and so forth.

The test processing module 405, after performing a lookup (410) of the test configuration data 407, enforces the requirements indicated in the test configuration data on the fields of the dataset 401 based on the identified semantic meaning for each of the fields. For example, the requirements 412 in FIG. 4A include a requirement to ignore a date of birth field in the dataset 401, and to enforce unique social security numbers. The test processing module 405 associates the attributes 430 with the requirements 412 of the test configuration data 407.

In some implementations, the attributes 430 of a semantic label 428 can include what relationship the field having the semantic label should be to another field having another particular semantic label. For example, the attribute 430 for a field 418 labeled "date of birth" may indicate that the value for the date of birth field of a given data entry should always be earlier in time than another value in a field labeled "date of registration." The attributes 430 of a semantic label 428 can indicate what the format of the data values for a field are, what values are permitted (e.g., the attribute may reference a lookup table that includes all possible values for the field). The attributes 430 can indicate how common a value of the field should be, an expected range of values for the field, and other such features of the data values of the field. The attributes 430 are used during the test generation process 400*b*.

FIG. 4B shows a process 400*b* for test data 422 generation by a test data generation module 415. The test data generation module 415 receives (440) the attributes 430 associated with the selected field. The test data generation module 415 can also determine how processing rules have processed the field in a prior test, if applicable. For example, processing rule data can be received that indicates how many times a processing rule was executed on fields labeled with the semantic label 428. In some implementations, this data is indicated in the test configuration data 407. In some implementations, for example, if the field has not been tested in prior tests, the field may be removed from the test data.

The test data generation module 415 receives (442) the test configuration data 407 and generates (446) the test data based on the requirements of the test configuration data 407 and the attributes 430. In an example, two values are included in the SSN field 418 that are each unique and that conform to the format requirements 412 of the test configuration data 407. The values in the SSN field are "555-55-5555," associated with a first user ID value (value 1) and "666-66-6666," associated with a second user ID value (value 2). The test data generation module 415 stores (448) the test data 422 in a test data data store 450 for use by one or more applications.

In some implementations, the test configuration data 407 can indicate subsetting rules for the test data 422. In this example, once the attributes 430 are identified, the test data generation module 415 receives the attribute values and processing rule data and determines what subsetting rules should apply to that field. The test data generation module 415 determines, based on the semantic label 428 for a field, a subsetting rule for the field. The subsetting rule indicates whether all the values or a portion of the values of a field should be included in test data for testing an application. For example, a particular semantic label can be used to determine whether the values of the field would be useful for testing in a given test, or whether the field should be ignored during a test. For example, fields that are not of interest for a particular application can be ignored when testing the application. As previously described, the semantic label is associated with one or more attributes in a data dictionary. The attributes indicate what the characteristics of the field should be. For example, the attributes together can indicate what the real world meaning is of the field is for the data. When configuring a test, a user can indicate what real world data are relevant from a larger dataset for the test. When the dataset is received, the test dataset module 106 can automatically select the relevant fields, and ignore the non-relevant fields.

The test data generation module 415 selects subsettting rules based on the attributes of the semantic label 428. In some implementations, the subsetting rules can be directly associated with the semantic label 428. For example, the subsetting rules can indicate whether particular fields should be included or not included in test data based on values included in the configuration data 407. For example, if the configuration data 407 indicates an execution count of operations on the field below a threshold number, the field can be removed from the test data.

Other data can be included in the configuration data 407. For example, the data 407 may specify that if the field fails one or more data quality rule tests, the field can be removed from test data. For example, empty values in the field, values that have data in the wrong format, or other such data can be removed from the field. In another example, if the attributes 430 indicate that the field includes PII, the field can be removed from the test data. In another example, values that fall outside a particular range can be removed from the test data. In another example, if a field includes several categories each with duplicate values, the subsetting rules can extract a set of data records having unique values. Ensuring that test data has a few duplicative values as possible ensures that a footprint of the test data is as small as possible while representing a full selection of possible test inputs for a system.

In some implementations, the test data generation module 415 can select one or more of the subsetting rules for application to the field. The selection of the subsetting rules can be validated by a user (e.g., through a user interface). The selection of the subsetting rules can be for any goal, but generally, the goal is to generate a test dataset 422 that provides complete operational coverage of the tested application while having as small a data footprint as possible. Thus, the subsetting rules are chosen to remove extraneous values from the dataset, such as duplicative values, erroneous values, wrongly formatted values, and so forth. In some implementations, a list of the selected subsetting rules can be sent to the output database 114 or test configuration data store 403.

In an aspect, the test data 422 can be sent to a data processing application that includes a processing rule configured to operate on a value of a field of the test dataset and generate at least one output value, the field being labeled with the label proposal. The test dataset generation module is configured to obtain execution information indicative of a number of times the processing rule was executed in connection with processing of the first dataset. Whether the processing rule is executed by the data processing application during processing of the first dataset can depend directly or indirectly on values of the field having the label proposal. The subsetting rule can be determined based on the execution information indicative of the number of times the processing rule was executed in connection with processing the first dataset. In this example, the subsetting rule includes an identification of the field of the dataset. For example, the subsetting rule can identify the field as a key field of the dataset comprising at least one key value for a data element of the dataset. In some implementations, the subset of the data records of the dataset comprises data records having key values with predetermined values. In some implementations, the subsetting rule identifies a list of key field names corresponding to the label proposal. The subsetting rule identifies the field as the key field by comparing the label proposal of the field to the list of key fields.

In an aspect, as stated previously, when the field of the dataset comprises personally identifying information (PII), the subsetting rule generation module can generate a subsetting rule configured for selecting the subset of the data records of the dataset that does not include PII information. Alternatively or in addition, when the field of the dataset comprises personally identifying information (PII), the test dataset generation module can be further configured to apply a masking function to the PII to generated masked data, and select the subset of the data records of the dataset that includes the masked data.

Figure 5A:
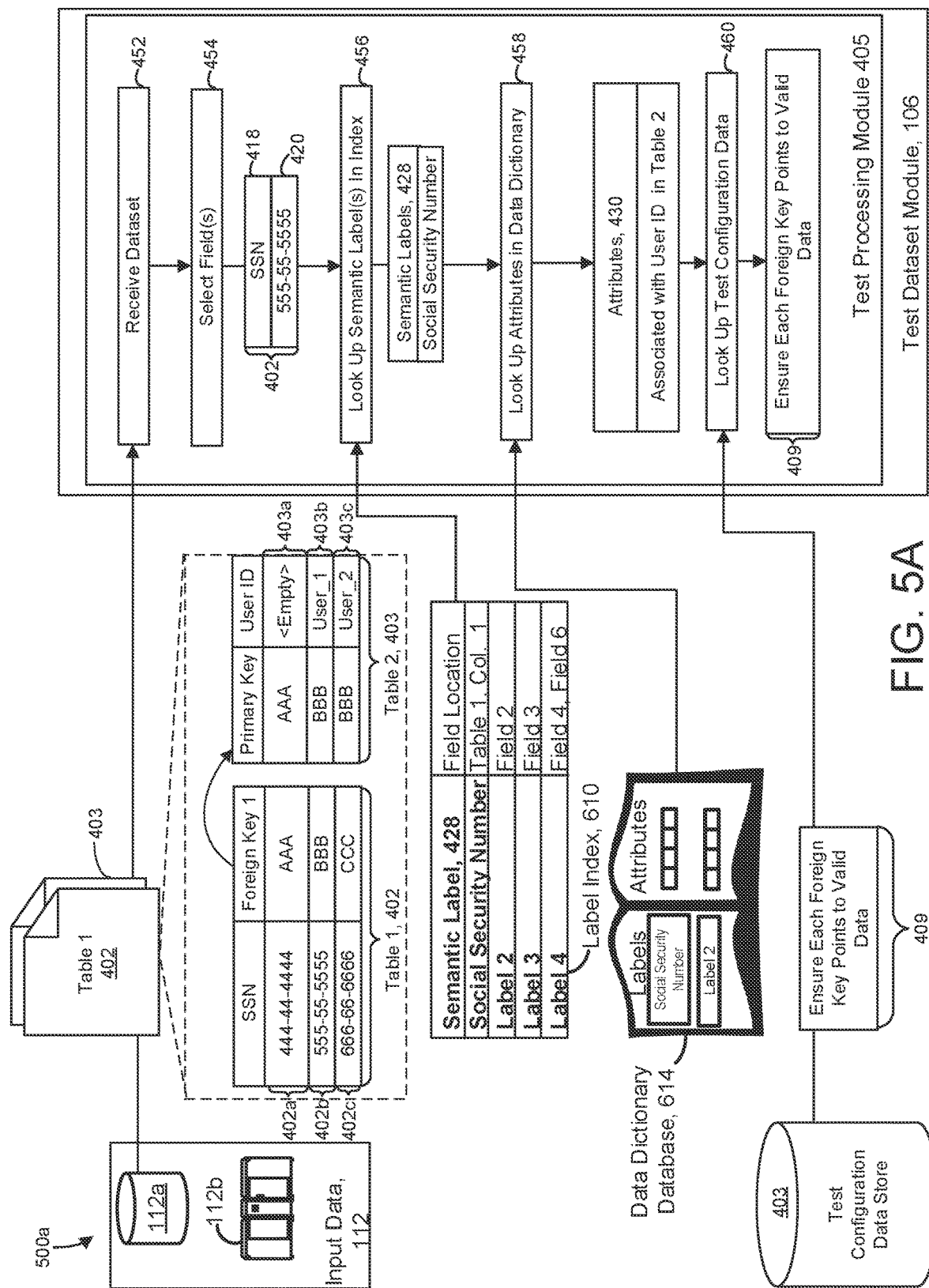
Figure 5B:
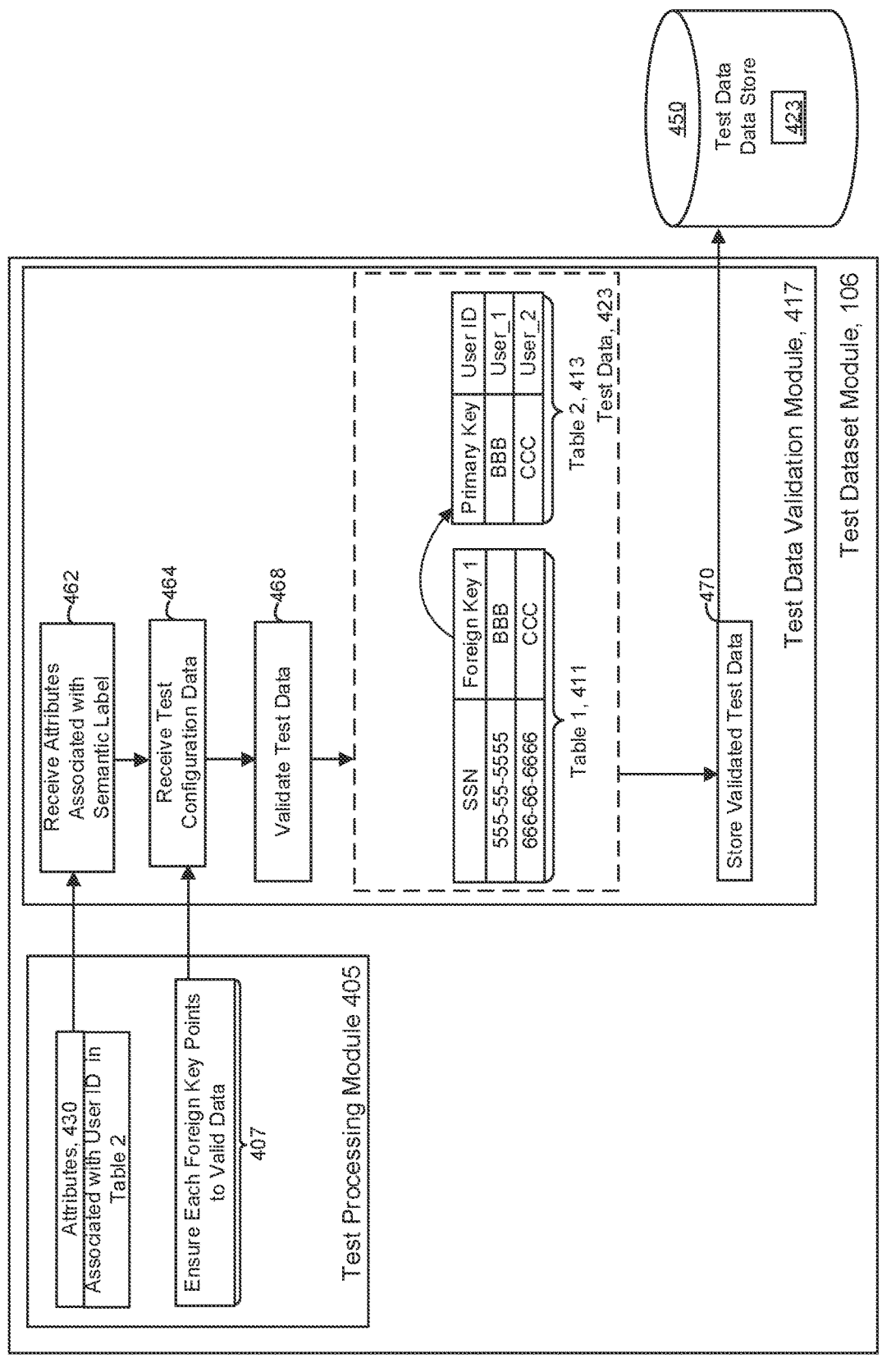

FIGS. 5A-5B show processes 500a and 500b in which the test dataset module 106 is configured to verify that the test data 422 correctly represents real data for testing a given system, which can include verification of the schema of the test data 422. For example, an application may expect certain kinds of data during operations. Test data should therefore approximate the real data to be processed by the application. To generate the test data that approximates real data, the test processing module 405 receives (452) the dataset 401 and selects (454) a field 418 and the values 420 of the field. The field 418 is labeled with the semantic label 428 called Social Security Number. The module 405 receives (456) the label and retrieves (458) the attributes 430 that describe the field 418. The test processing module 405, from the semantic label 428, with which attributes 430 the field SSN is associated. The attributes 430 can indicate characteristics of the field in real-life data. For example, actual social security numbers are linked with real people, who can be represented in a User ID table. In this particular case, all real social security numbers are associated with a real person, but not all real people have social security numbers. The test data generation module 408 is configured to generate a test data table that satisfies these metrics.

The processing module 405 retrieves (460) schema data 409 from the test configuration data store 403. The schema data 409 can be determined during or after the semantic discovery process (described in relation to FIG. 6B) by the dataset schema analysis module 110 (described in reference to FIGS. 7A-7B). The schema data 409 can indicate which fields are join keys in a dataset, which fields are primary keys, which fields are foreign keys, and so forth. For example, the schema data 409 can include names of the fields that are keys. Thus, the test dataset module 106 is configured to generate test data that is referentially sound because it properly references other tables in the test data as expected. More specifically, if in real data, the table with social security numbers includes a reference to a user ID table, the test dataset generation module is configured to generate a table of social security numbers with a field including keys that properly refer to an existing user ID table in the test data. When the test data are used by an application, the test data approximates real data expected by the application. A user that is testing the application can be confident that errors in the results of processing the test data are a result of errors in the application itself, rather than being errors in the test data.

FIG. 5B shows a process 500b for test data validation by the test data validation module 417. The validation module 417 validates whether the test data 423 satisfies the schema rules 409. The test data 423 includes tables 411 and 413, which have been updated from tables 402 and 403 to remove duplicate or incorrect values and records in the tables. For example, the table 402 includes entries 402a-c, each including a foreign key that references the primary keys of corresponding entries 403a-c in table 403. However, as shown in FIG. 5A, the primary keys of table 403 duplicate entries for key "BBB." Additionally, there is a missing USER ID for SSN 444-44-4444 for entry 402a/403a. The test data generation module 415 removes the entry 402a and 403a from the tables 402, 403, and corrects the key value of entry 403c to be "CCC" instead of "BBB," so that the primary key requirements of the test configuration data 407 (e.g., each primary key is unique) are satisfied. For validation by module 417, the primary keys of table 413 are validated as being valid, and all entries of tables 411 and 413 are validated as including valid user ID values. The validated test data 423 are stored (470) in a test dataset data store 450.

Figure 6A:
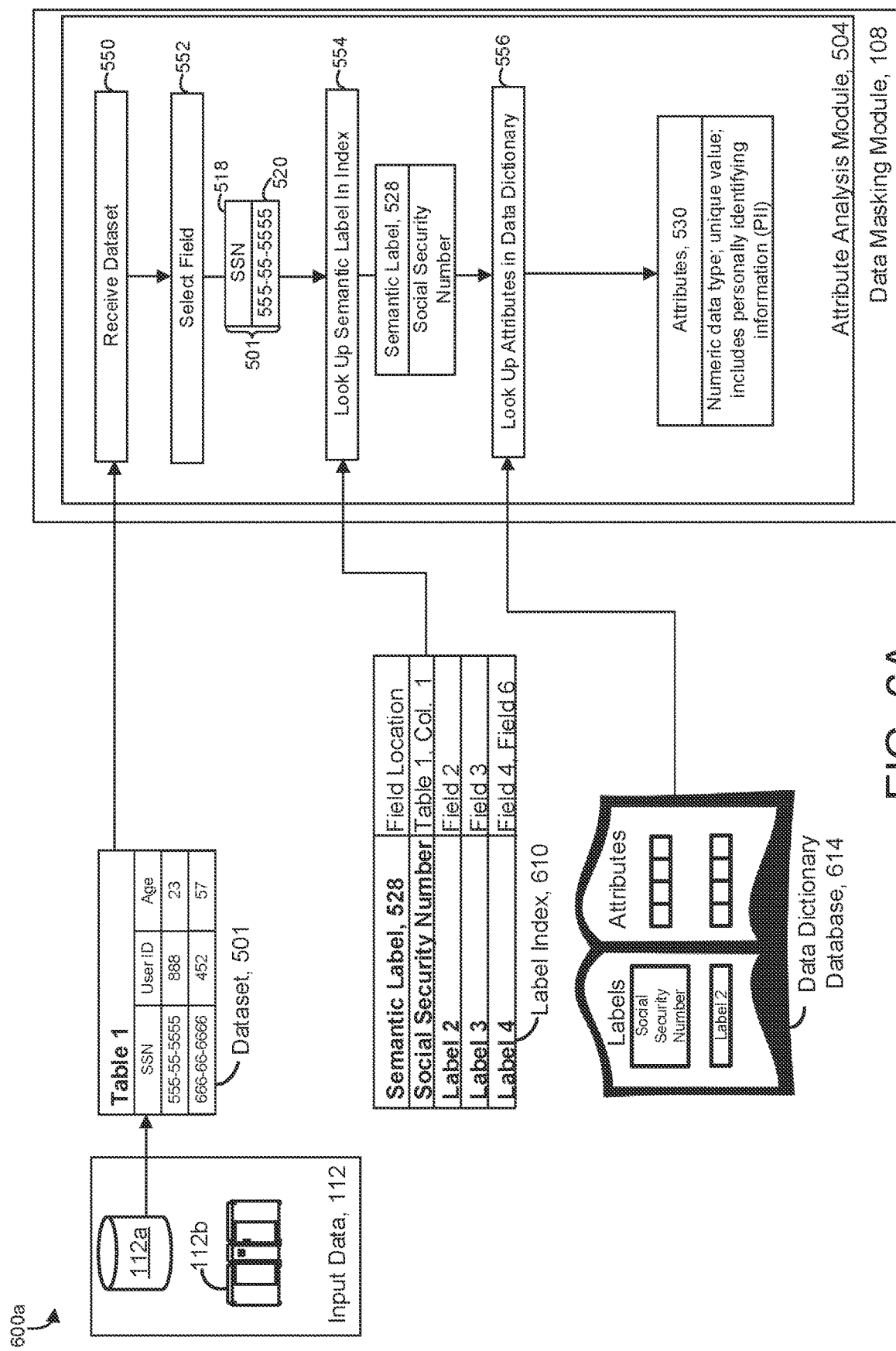
Figure 6B:
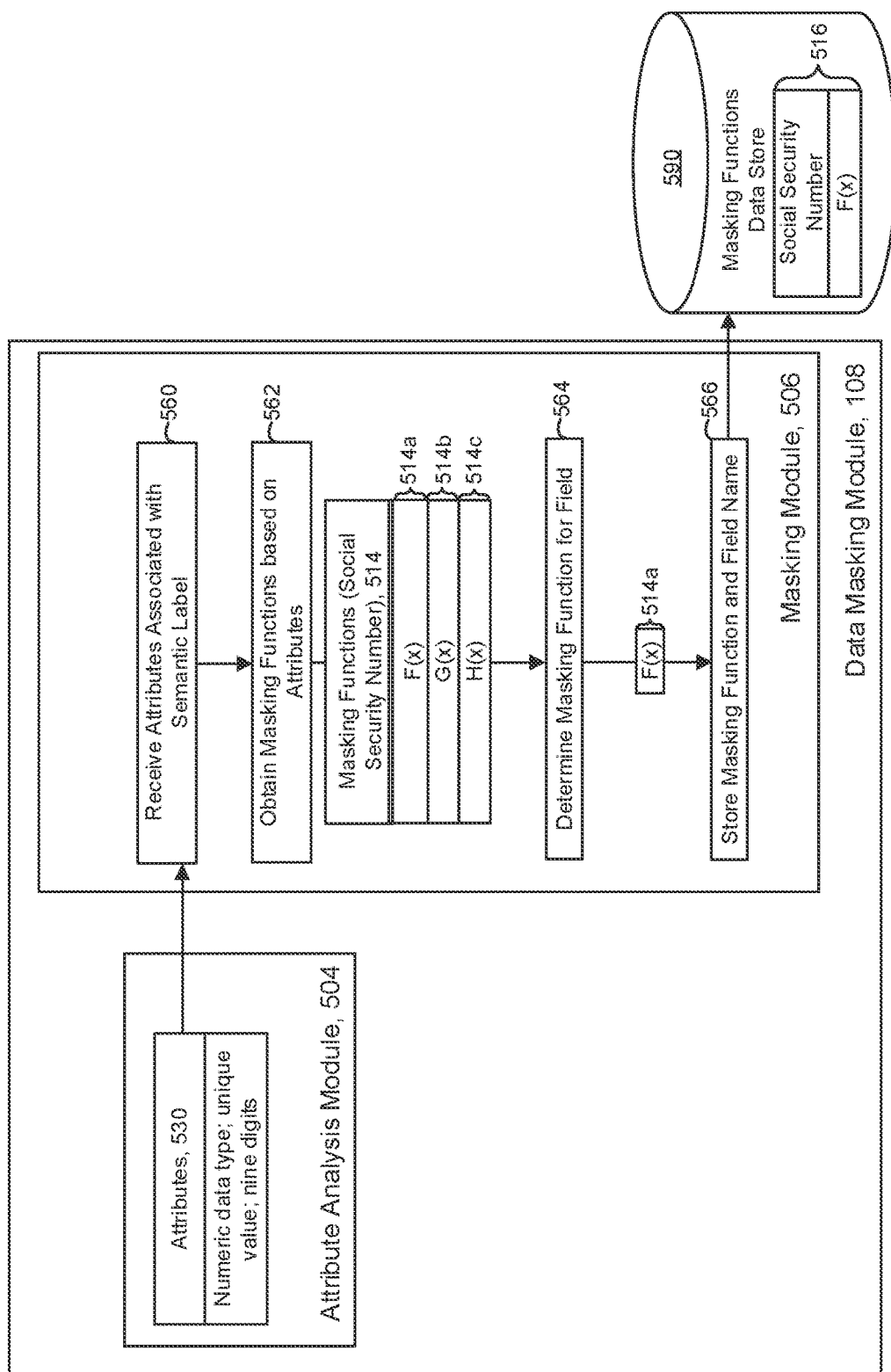
Figure 6C:
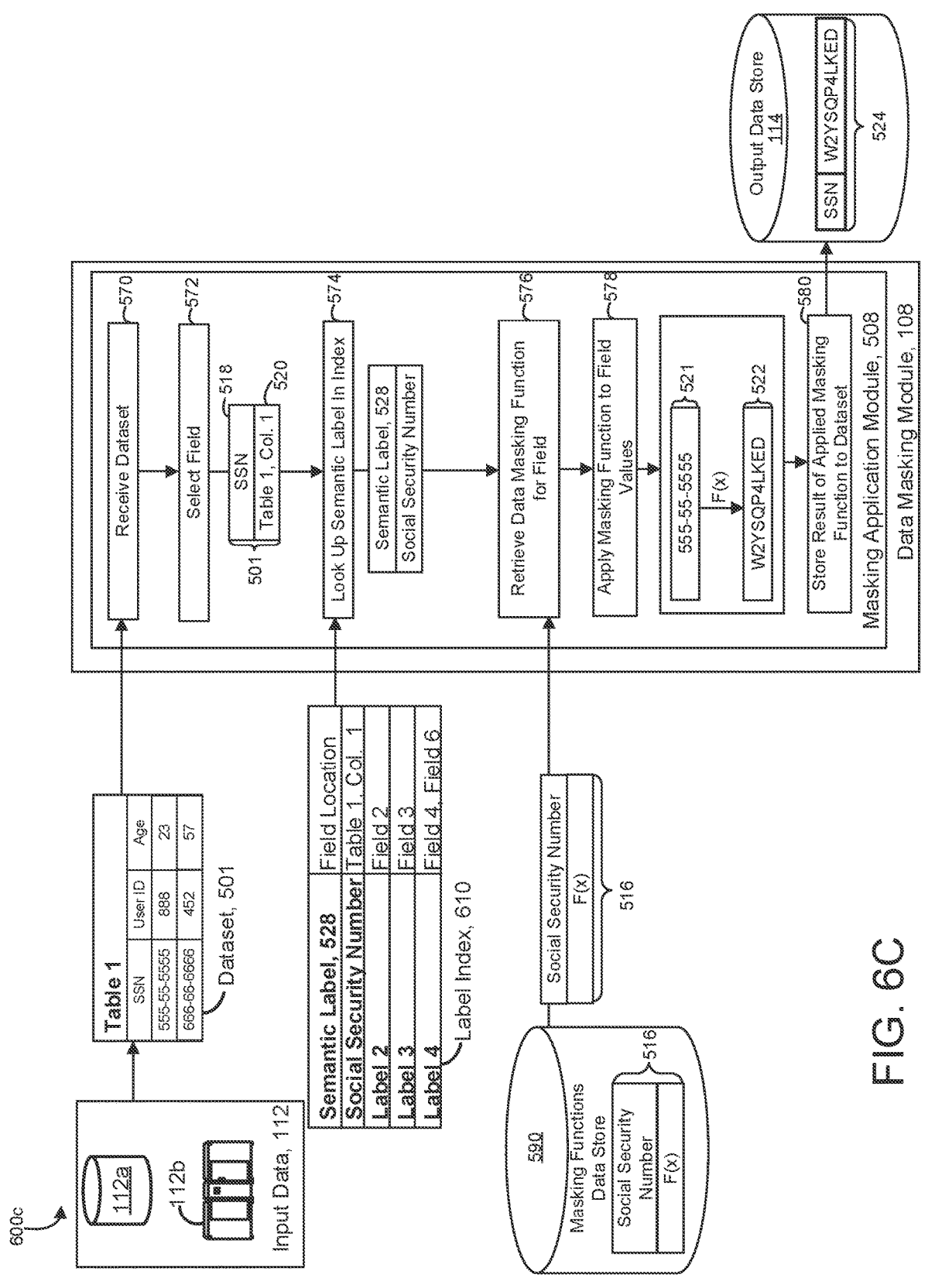

Referring to FIGS. 6A-6C, processes 600a, 600b, and 600c for masking data by the data masking module 108 are shown. The data masking module 108 is configured to determine which fields of the dataset 501 (e.g., from input data 112) should be masked, and if so, which masking functions to apply those fields. The masking functions are associated with fields by the data masking module 108 using the attributes 530 and semantic labels 528 of the dataset 501.

Generally, to generate masked data, the attribute analysis module 504 of the data masking module 108 receives (550) a dataset 501 that includes a fields (e.g., field 518) having values (e.g., value 520). The attribute analysis module 504 selects a given field, such as field 518. The attribute analysis module then retrieves (554) an associated semantic label in index 610, and determines which attributes 530 to retrieve (556) from the data dictionary database 614.

The semantic labels 528 are stored in a data dictionary that associates each semantic label that is available to its attributes 530. When a field is labeled, a semantic label 528 is selected from the data dictionary, and the field is associated with the attributes 530 of the semantic label. An index is stored that indicates, for each semantic label 528 of the data dictionary, the field(s) associated with that semantic label (if any) in datasets processed by the data processing device 102.

Each semantic label 528 is associated with one or more attributes 530 that indicate the semantic meaning of the semantic label. The attributes 530 of a semantic label 528 can include what relationship the field having the semantic label should be to another field having another particular semantic label. For example, the attributes 530 for a field labeled "date of birth" may indicate that the value for the date of birth field of a given data entry should always be earlier in time than another value in a field labeled "date of registration." The attributes 530 of a semantic label 528 can indicate what the format of the data values for a field are, what values are permitted (e.g., the attribute may reference a lookup table that includes all possible values for the field). The attributes 530 can indicate how common a value of the field should be, an expected range of values for the field, and other such features of the data values of the field.

The attributes indicate what the characteristics of the masked field should be. For example, the attributes together can indicate what the real world meaning is of the field is for the data. When masking data, a user can indicate what real world data are relevant for masking. When the dataset is received, the data masking module 108 can automatically select the relevant fields for masking, and ignore the non-relevant fields.

The data masking module 108 determines, based on the attributes 530 for a field, a masking function for the field. The masking function indicates whether all the values or a portion of the values of a field should be masked for a given application. For example, a particular semantic label can be used to determine whether the values of the field include PII, or whether the field should be ignored during masking. For example, the values of fields that include names can be scrambled, mixed so that they are associated with different indexes, or otherwise anonymized for subsequent applications.

FIG. 6B shows a process 600b by which the masking module 506 applies masking functions to the fields of the dataset 501. The masking module 506, once the attributes 530 are received (560), is configured to obtain (562) masking functions based on the attributes. The attribute 530 values may indicate that the field 518 should be masked, and how the field should be masked. For example, a list of masking functions can be referenced by the attributes, or a specific masking function can be indicated. In some implementations, the attributes 530 can merely indicate that the data of the selected field includes PII, and the masking module 506 determines how to mask the values of the field. In some implementations, the masking function is based on a group of fields, such that masking functions are applied to one or more of a group of fields when the fields are presented together. This can occur when PII may be revealed only when the fields are presented together, but not when any of the fields is presented individually.

The data masking module 108 can use one or more masking functions 514 for masking the data. Masking functions 514a-c can include shuffling values in a field, substitution of values in a field with alternative values, applying a variance to numerical values in a field, encryption functions, deletion of the masked values, or other masking functions. In some implementations, the masking functions can be combined with the test dataset generation and/or data quality processes previously described such that the masked data is valid test data and/or still conforms to one or more data quality rules for the field. The different requirements for these processes can be related using the semantic label 528 for the field.

The masking module 506 determines (564) which masking function(s) should be applied to the field, if any. The selected function 514a and the selected field are stored (566) in a masking functions data store 590. Therefore, when instances of the field 518 are received for masking, the masking application module 508 can determine which masking function to use for masking, or which of the masking functions has been used (in order to unmask the data, when applicable.

FIG. 6C shows the masking application module 508, which is configured, during process 600c, to mask or unmask data received in accordance with masking functions associated with the fields of the received dataset 501. The masking application module 508 is configured to receive (570) the dataset 501. The masking module 508 selects (572) a field (e.g., field 518) with a location 520 in the dataset 510. The module 508 looks up (574) a semantic label in index 610 and determines which attributes 530 are associated with the field 518. The attributes 530 indicate which masking function to be used, as represented in masking functions data store 590. The module 508 retrieves (576) the masking function data 516 from the data store 590, and applies (578) the masking function to the field values of the field 518. For example, a field value 521 that is "555-55-5555" is transformed by function F(x) to a masked value 522, which is "W2YSQP4LKED" (or another value, depending on the masking function being used). The module 508 stores (580) the masked result 524 of the masking to an output data store 114.

In an aspect, the data masking module 108 is configured to determine that a relationship exists between the field having the semantic label and a second field having a different semantic label. In response to determining that the relationship exists, the rule application module 408 performs the data masking function to transform values in the second field into masked values. In some implementations, a different function can be used to mask the second field than was used to mask the first field.

In an aspect, determining that the relationship exists comprises determining that the first label and the second label are associated with a common data source. For example, the common data source can include a user profile. The relationship can be indicative of a dependency of a value of the second field on a value of the first field or the value of the first field on the value of the second field. In some implementations, the relationship is indicative of a correlation between first values of the first field and second values of the second field. In yet another example, the relationship includes an arithmetic function. The masking module 508 can be configured for selecting a type of the data masking function based on a type of the relationship. A previously described, the type of the data masking function can include one or more of a shuffling function, data encryption, character scrambling, and data substitution.

In an aspect, the module 508 can be configured for scanning the dataset 501 to determine whether one or more particular values of at least one other field are transformed into masked values. In some implementations, the module 508 can be configured to select a masking function for a first field of the dataset comprising numeric values, and wherein a second, different masking function is selected for a second field of the dataset comprising non-numeric values.

FIG. 7A-7B show processes 700a-700b for determining a schema of a dataset 701 based on the semantic labels associated with the fields of the dataset. The dataset schema analysis module 110 is configured to determine what the schema of the dataset is. For example, the dataset schema analysis module 110 is configured to determine what fields are key values or indexes, how the fields reference one another, and so forth.

Generally, to determine the schema of a dataset, an attribute analysis module 704 receives a dataset 701 that includes one or more tables 701a-b and fields that are labeled with the semantic labels. The dataset schema analysis module 110 determines, based on the semantic labels for the fields of tables 701a-b, such as the SSN field and the Field_Index, including the relationships between and among the values of the fields. The schema of the dataset 701 can indicate which fields are indexes and which values refer to other values within the dataset. This information can be used in downstream applications, such as for merging datasets, transforming datasets for storing in a data warehouse, and so forth. As previously described, the semantic label is associated with one or more attributes in a data dictionary 614. The attributes 730 indicate what the characteristics of the field should be. For example, the attributes 730 together can indicate what the real world meaning is of the field is for the data. When determining a schema of the dataset, a user can indicate what real world data are relevant for the schema. When the dataset is received, the dataset schema analysis module 110 can automatically select the relevant fields as being indexes, and ignore the non-relevant fields.

In an aspect, the analysis module 705 receives (702) a data record 701 including fields of the dataset. Each field generally includes a field name and one or more data values. For a particular field 718, the module 705 selects (704) the field and determines (706) the semantic label 728 associated with the field. For a dataset, values of different fields can be related by being in a common data record. A data record can be a row of a table in the dataset, or can simply be a collection of data values from one or more of the fields. The steps for determining what the semantic label 728 is for the field are described in relation to FIG. 8, below.

The module 705 determines (708) the attributes 730 for the field 718. The attributes 730 can indicate the relationship between Social Security Number and User ID fields. The module 705 sends the discovered relationships in the dataset to the schema update module 508.

FIG. 7B shows a process 700b for determining or updating the schema of a dataset using the schema update module 707. The module 707 can update the values of the dataset to comport with the schema referenced in the attributes 730. In some implementations, module 707 updates a schema describing the particular dataset 701 to explicitly include the discovered relationships between and among its fields. The module 707 receives (712) the attributes 730 for the dataset 701 and determines (714) the relationships by scanning the fields based on the information given by the attributes 730. For example, the module 707 may determine that Field_Key of Table 1 points to Field_Index of Table 2 in the data 701. The module 707 updates (716) the schema describing the dataset 701 to include this relationship with schema data 735. For example, the schema data may indicate that "Field_Index of Table 2 is Primary Key. Field_Key is Foreign Key of Table 1 for Table 2." The generated schema 735 is stored (721) in a schema data store 750. Downstream applications can access the data store 750 for using the schema data 735.

In an aspect, the schema update module 707 is configured to generate a dataflow graph based on the schema data. The dataflow graph may operate on the dataset based on the relationships in the schema data 735. For example, the schema update module can be configured for generating a join function configured to join the first dataset to the second dataset based on the key values.

Figure 8:
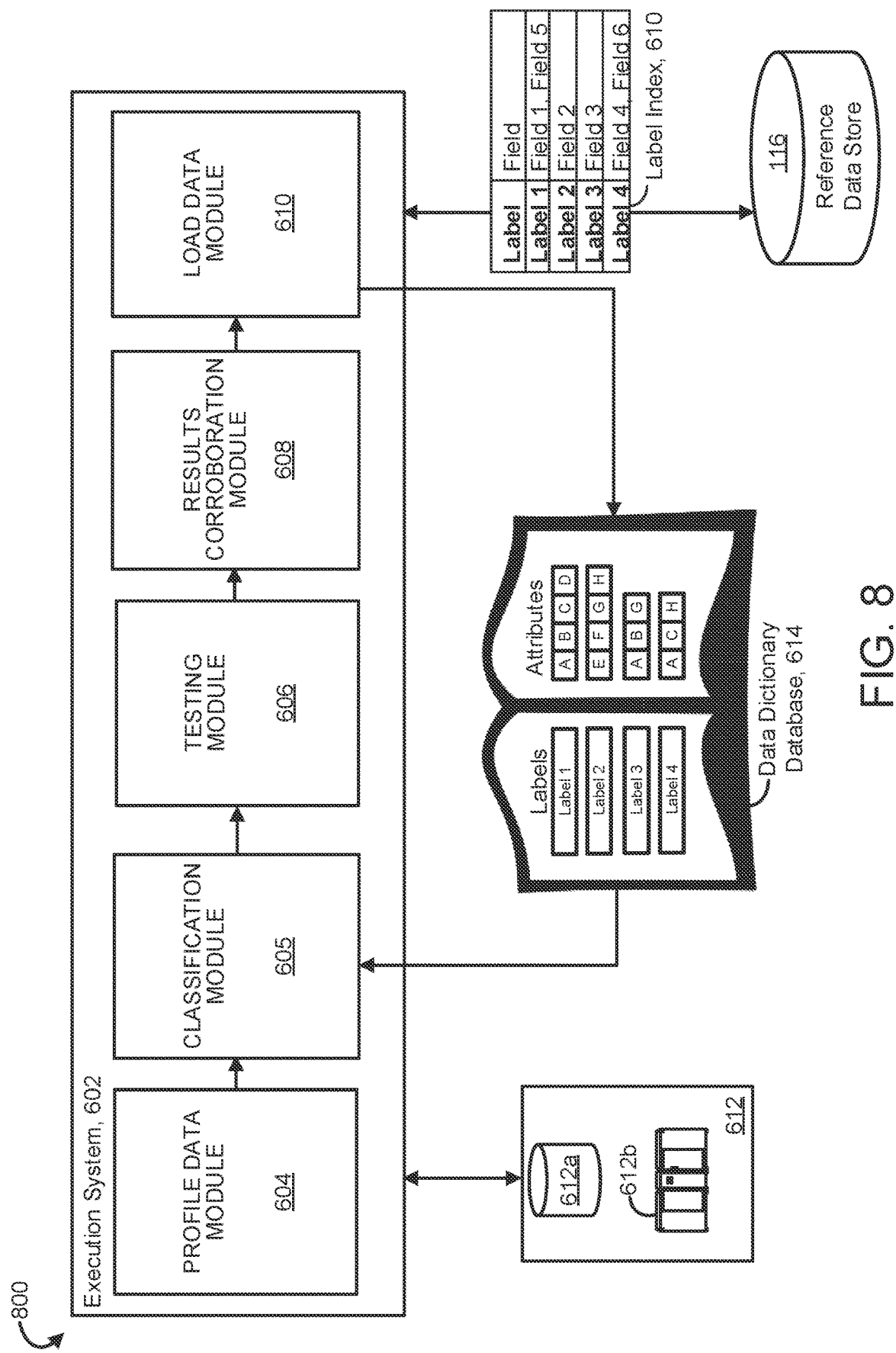
FIG. 8 is a block diagram of a data processing system.

Referring to FIG. 8, networked system 600 for discovering, classifying and labeling data fields by analyzing a data profile generated from data of the data fields is shown. The networked system 600 includes an execution system 602, one or more data sources 612, reference database 216, a development environment 620, and a production environment 614. The execution system 602 is configured to receive source data from data source(s) 612*a*, 612*b* (collectively data sources 612) in the networked system 600. The execution system 602 is configured to profile source data received from the data sources 612 to generate a data profile representing the source data of the data sources 612. The execution system 602 is configured to analyze the profile data to discover, classify, and label portions of the source data. More specifically, the execution system 602 uses the profile data to classify portions of the source data. Classifying the source data comprises associating a probability with the portion of the source data. The probability specifies a likelihood that the portion of the source data corresponds to a label known by the execution system 602. The execution system 602 is configured to, either automatically or in response to user input, tag the portion of the source data with one or more labels. The discovery, classification, and labeling of the source data can be iterated to improve the classification of the source data and increase the accuracy of labeling the source data. The labels of the source data comprise metadata that is associated with the source data. Once the discovery, classification, and labeling of the source data are completed, the labels are loaded into the production environment 614 for use by one or more downstream applications. The semantic discovery process is described in detail in U.S. application Ser. No. 16/794,361, titled Discovering a Semantic Meaning of Data Fields From Profile Data of the Data Fields, filed on Feb. 19, 2020, and incorporated by reference in entirety herein.

The source data of the data source 612 can include several different kinds of data. In one example, the source data of the data source(s) 612 includes tables with data fields. The execution system 602 is configured to discover, classify, and label the data fields of the tables. For example, the execution system 602 analyses the data content of each discovered field of the source data and determines what the data content of the data field is representing. The execution system 602 classifies each data field by associating the data field with a known label (e.g., by assigning it a probability value). The labeled data of the tables can be output to a data storage 614 that is accessible by other applications and systems for operating on the labeled data. The process of discovering, classifying, and labeling the data fields of data tables is subsequently described in detail. Data sources 612 can include any type of computing system. For example, data sources 612 can include mainframes, databases, unstructured data supplied from a third party, data lakes, personal computers, high-scale networks, and so forth.

In this disclosure, the processes for discovering, classifying, and labeling data fields of data tables are used as examples to illustrate the functionality of the execution system 602 and the networked system 600. However, while data fields are one example of something that the execution system 602 is configured to discover, classify, and detect, the execution system 602 can operate on other types of data. For example, the execution system 602 receives application data from an application. The execution system 602 is configured to discover, classify, and label different data for the application. The data can include different files that are stored and accessed for operating the application. The execution system 602 can be used to discover PII stored by applications, discover malware, changes to the application files, and so forth. In another example, the execution system 602 can analyze files stored in a file system (e.g., on a personal computer). The execution system 602 can scan the file system to identify a particular file subset defined by the user. For example, a user might wish to remove work files from a home computer before reformatting the home computer. The execution system 602 can be configured to scan the file system of the home computer and tag all the work files. The execution system 602 can be configured to label data for data subjects' rights, such as right to forget, data erasure, subject access requests, data correction requests, data suspension, data portability, and consent. Numerous other applications are possible.

To discover, classify, and label portions of the source data (such as data fields), the execution system 602 is configured to access a reference database 216 for one or more files 618. The files 618 provide the execution system 602 with context for performing the discovery, classification, and labeling of the source data. In some implementations, the reference database 216 can store a lookup table that stores relationships between values that are found in entries of the data fields. For example, the data storage can include a lookup table matching codes to a glossary of terms which can be referenced by the execution system 602 during discovering, classifying, and labeling of the source data. The files 618 of the reference database 216 can include weight values used for classification. For example, the weight values can indicate to the execution system 602 the probability that two terms (e.g., business terms) are related to one another for the source data 612 being labeled. These values can be generated during an initial iteration of the discovering, classifying, and labeling of the source data 618, and updated during subsequent iterations, either by the user or automatically.

The files 618 can be defined in advance of discovering, classifying, and labeling of the source data by the execution system 602, during the discovering, classifying, and labeling, or after the discovering, classifying, and labeling in an iterative process. A developer environment 620 of the networked system 600 can provide a means by which the user can write to the reference database 216 or update files 618 of the data storage. For example, the development environment 620 can include a user interface that provides feedback to a user of the execution system 602. For example, the user interface of the development environment 620 can display reports showing how the execution system 602 is performing, such as what data fields are labeled and with what probability each classification is made by the execution system 602. Examples of feedback provided to the user and the user interface are subsequently described in detail.

Generally, the execution system 602 includes one or more processors configured to execute the logic of the profile data module 604, the classification module 605, the testing module 606, the results corroboration module 608, and the load data module 660. The operations of each of the profile data module 604, the classification module 605, the testing module 606, the results corroboration module 608, and the load data module 610 can be performed either by batch processing or in real-time. Additionally, the execution system 602 can perform the operations of each of the modules 604, 605, 606, 608, 610 either approximately contemporaneously or during different time periods. For example, in some implementations, the profile data module 604 generates profile data representing a profile of the source data from the data sources 612 at a first time. At a later time, once all the data from the data sources 612 for a given time period has been profiled by the profile data module 604, the classification module 605, the testing module 606, results corroboration module 608, and load data module 610 can analyze the profile data to discover, classify, and label data fields of the source data and load the data into the reference database 216 for one or more downstream applications, as previously described in relation to FIGS. 2A-7B.

The profile data module 604 is configured to receive the source data (e.g., tables, files, etc.) and generate a data profile of the source data. The profile data module 604 discovers fields of the source data (e.g., one or more datasets). The profile data module 604 can discover fields by identifying rows of tables in the source data, finding field names, references to fields, or using any similar process. The profile data module 604 determines statistical attribute(s) of the data fields and generates profile data including those statistical attributes. The profile data identifies patterns in the source data. More specifically, the profile data includes statistics about the values of data fields of tables of the source data. For example, the profile data can include information specifying whether the data values of a data field include numerical data, character strings, etc. For example, the statistics about the data values can include a maximum value, a minimum value, a standard deviation, a mean, and so forth of the values that are included in each of the data fields (if the data are numerical). In some implementations, the statistics about the data can include how many digits or characters are in each entry of the data values. For example, the data profile can indicate that each data value of a data field includes seven (or ten) numbers, which may provide a contextual clue indicating that the data field includes telephone numbers. For example, the data profile can indicate that each entry of the data field includes a value from a small set of values, which may be used to trigger comparisons to lookup tables by the testing module 606.

Data ingestion for the profile data module 604 includes analyzing the field names of the fields, the location of the fields in the tables (or files in the file system), and analysis of the schema of the data. In other words, data ingestion occurs at the field level, the dataset level, and the schema level.

For the field level, the profile data module 604 analyzes the values of the fields and entries of the fields to generate the profile data. The profile data module 604 can determine whether the value of the field or its entries are null, blank, valid for a particular data type, and so on. The profile data can include statistics on null percentages, blank percentages, and value per field percentages. The profile data module 604 can also generate data indicate a change of these percentages from a baseline percentage (which can be specified by a user through the development environment or automatically generated). In another example, the profile data can include an indication of whether the data of an entry is valid for implicit data type. For example, if a data field is known to be a string field, but date data is found, it may be inferred that the data are invalid for that entry. In another example, the profile data can include an indication that data of an entry are valid for a specified format (e.g., two decimal places are required, but no explicit type is specified). In some implementations, some of this functionality is executed by the testing module 606 after the profile data are generated.

For the dataset level, the profile data module 604 can provide statistics that relate a portion of the source data to the dataset of the source data overall. For example, the profile data module 604 includes an indication of natural key uniqueness and key cardinality. The profile data module 604 indicates whether there exist duplicates on key values of the source data. The profile data module 604 indicates whether there are duplicates on approximate natural key matches. The profile data module 604 indicates a count of records with one or more of these features. In some implementations, this information is determined by the results corroboration module 608 after, for example, a field is determined to be key values.

For the schema level, the profile data module 604 is configured to determine the statistical information of a data field with respect to the source data over time. For example, the profile data module 604 detects whether there are added or removed columns in a new version of the source data. The profile data module 604 detects delimited fields. In some implementations, the profile data module 604 performs a lineage count to determine whether any records were dropped from a prior version of the source data. Other schema evolution can be detected. In some implementations, this functionality is performed by the results corroboration module 608 after data fields are discovered in the profile data.

In some implementations, the profile data can be improved if contextual data are available in the reference database 216. For example, if the user specifies formats for one or more data fields of the source data, the profile data can generate additional statistical information about those data fields. This can be part of an iterative process. For example, once a data field is discovered in a first iteration (but if classification fails for that iteration), a user might look at the data content of the data field and provide the execution system 602 with additional information for analysis by the profile data module 604 (and other data modules). For example, if the user specifies that all data fields should include only numerical data, the profile data module 604 can quickly determine what data is invalid and provide statistical measures of the that information in the data profile.

The profile data module 604 generates the profile data from the source data by scanning the entire dataset of the source data before generating the profile data. The profile data module 604 does not need to copy the entire dataset from the source data, though this could be performed to generate the profile data. Because the datasets can be large (e.g., many gigabytes in size or even many terabytes in size), wholesale copying of the data to a local system for analysis may be impractical. Generally, the profile data module 604 scans over the source data during periods of low activity for the data sources.

The classification module 605 is configured to receive the profile data and receive the source data including the fields. For each field of the source data, the classification module 605 is configured to look up the label index including existing labels for discovered fields of the source data (e.g., from the reference database 216). These labels can be from prior iterations of the labeling process or the label index (e.g., an initial label index) can be manually generated, imported, or otherwise acquired. However, a label index need not exist prior to performing the labeling process.

For a field, the classification module determines whether the field is already associated with a label in the label index. If a field has not yet been labeled, or if no label index exists, the classification module 605 determines that no label was found for the field. If needed, the classification module 605 generates a new label index to populate with semantic labels. The classification module 605 performs a classification of the field data type. The classification can be based on the profile data of the field, the field name, and the values of the field. For example, the classification module 605 can determine that a field is a "date" field. In some implementations, the classification module 605 can determine that the field is a numeric field, a string field, or other such data type. While the classification module 605 determines a data type for the field, the semantic meaning of the field (and thus the semantic label) is determined by the testing module 606, as subsequently described. For example, the classification module 605 can determine that the field is a date field, and the testing module 606 determines that the dates of the date field are "Dates of Birth" for customers. In another example, the testing module 606 determines that a numeric field is a "User ID" field. Many other such examples are possible. The classification module 605 generates classified data to be sent to the testing module 606 as a classification output for finding the semantic meaning. The classified data is tagged with the data type determined by the classification module 605.

If a label is found, the classification module generates label data that can be passed through the testing module 606 and the results corroboration module 608. The label data informs the testing module 606 and the results corroboration module 608 that the field has already been labeled. This can be used to weight the classifiers applied to the field or suggest a label. However, the field can be re-classified by the classification module 605 and re-tested by the testing module 606 to confirm that the label is accurate and potentially update the label attributes of that label in the data dictionary database 614. For example, if the testing module 606 finds the existing label to be a poor fit, a new label can be suggested. If a user selects the existing label (e.g., as presented by the results corroboration module 608), the label data can be used as a flag to the execution system 602 that the label attributes of the label in the data dictionary database 614 are not representative of the data values being labeled by that label, and these attributes can be updated.

In some implementations, the classification module 605 can be updated over multiple iterations using machine learning approaches. For example, if a discovered field has already been labeled, the classifier can determine that further classification can be bypassed. In another example, a score that was applied to a field can be updated based on additional data that is received from the data source 612 or from user input. The classification module 605 can determine that different test(s) should be performed by the testing module 608 in comparison to a prior iteration. For example, if a fingerprint analysis was inconclusive in a prior iteration, the classifier can determine that this test should be bypassed (or replaced with another test) in a subsequent iteration.

The testing module 606 is configured to classify the source data of the dataset using the statistics in the profile data and using additional contextual information provided in the reference database 216 (such as lookup tables 442). The classification output of the classification module 605 is used to provide the context of a data type for each field and to provide existing labels for the field (if any). The testing module 606 is configured to receive candidate labels 440 from the data dictionary database 614. The candidate labels are a library of existing labels, each associate with one or more attributes, that identify the semantic meaning of a data field (e.g., to a downstream application or a user). As previously stated, the attributes associated with each label in the data dictionary database 614 provide the semantic meaning of the label. The testing module 606 determines which of those candidate labels is the most closely associated with the attributes of the data fields determined by the data profile, the field names, and the data values of the fields.

The testing module 606 includes a plurality of tests (or classifiers), each executed by a different testing module, for associating one or more labels with each field being tested. For example, after fields of the dataset are discovered by the profile data module 604, the testing modules determine how closely the attributes of the field correspond to the attributes of each of the candidate labels. Each test uses different data and approaches to propose one or more labels. Because the different tests use different approaches for classification, the proposed labels from each test may not necessarily be the same. The proposed labels are corroborated in the results corroboration module 608, subsequently described. The use of different tests to identify the semantic meaning of the fields results in a much more robust determination of the semantic meaning than using any single test because no single factor (e.g., a field name, or the inclusion of a particular value or set of values in the field, etc.) is relied upon as indicative of the semantic meaning for the field.

The testing of the data in each data field can include determinations of one or more of population levels of data of datasets (how often values occur in the data field), discovered data types (e.g., dates or numbers are held as strings), domains of the data field, discovery of key fields, determinations of whether fields are single words or description fields, and so forth. For example, the classification of the data can include date and time analysis. The testing module 606 thus receives the profile data from the profile data module 604 and performs a series of statistical-based functions to identify, classify, and test the field details against a set of known label types. The rules of the testing vary depending on the data type, which can be identified by the classification module 605 in the classification output, or in some cases be included in the profile data generated by the profile data module 604.

The testing module 606 is configured to perform a plurality of different classification tests on the field names and the entries in the data field to determine how to label the data field. The testing module 606 receives the classification output, the candidate labels, and the any reference data from the reference database 216 and provides these data to the tests. The tests include a pattern analysis, a business term analysis, a fingerprint analysis, and a keyword search. As previously stated, while tables with field names and field data are described as an illustrative example, the tests of the testing module 606 can be performed on other data types. Examples of classification tests that are executed against the data fields and data entries of the source data can include a fuzzy matching plan, a column data plan, a business term matching plan, keyword matching, a fingerprinting plan (e.g., contextual data lookup), pattern matching, and corroboration.

The fuzzy matching logic of the testing module 606 includes logic for fuzzy matching of field names from a dictionary of terms. Generally, fuzzy matching is configured to find a match between a field name and a term in the dictionary when an exact match cannot be found. The system finds dictionary terms that are less than exact. For example, the testing module 606 sets the threshold of the fuzzy match to a percentage value less than 100, and the dictionary database (e.g., database 216) will then return any matches in its memory corresponding to (e.g., greater than)

that percentage. In some implementations, a probability score is assigned to each match. The probability score can be presented to the user.

The business term analysis of the testing module 606 includes logic for matching a data field name to a business term that is known in a glossary of terms. Generally, the business term can be placed in different contexts or business term groups. The testing module 606 performs a check to find the occurrence of a particular word or term within another word or term. This can include references to a particular specification. For example, the testing module 606 receive a specification indicating different abbreviations for street names, such as "st", "ln", "ave", "pl", "ct", and so forth. The testing module 606 performs a check to determine whether any of those abbreviations is included within the data field. If one or more of the data elements of the specification are included in the data field, the testing module 606 determines that the data field includes street names. This piece of information can be used on its own, such as to determine that the data field includes street names and therefore should be labeled as such. This piece of information can also indicate that the data field includes other information, such as addresses. The testing module 606 uses the determination that there are street names in a column in addition to other data to determine whether the data field includes addresses, street names only, or some other data. In another example, the phrase "date of birth" could be recognized and associated with such a label. Other matching strategies can include matching using fuzzy matching, synonyms, etc. Generally, the testing module 606 associates a probability score with each match. The user can generate the specifications to configure this logic, such as through the development environment.

The pattern matching analysis of the testing module 606 uses the data content of the fields (in addition to or instead of the field names). The types of pattern matching that are used for the pattern matching can be determined by the testing module 606 based on the results of the classification data. For example, the classification data may identify a data type of a field, such as that the data are numerical. In this example, the profile data also indicates that each entry in the data field is 13-18 characters long. This may indicate to the testing module 606 that the data field may be a credit card number data field. To confirm this, one or more pattern tests can be executed by the testing module 606 against the data of the suspect data field. For example, the first 4-6 digits for each entry can be checked against a table of issuer codes. The last number can include a check digit defined by a Luhn test. If a threshold percentage of the entries for the data field satisfy each of these patterns, the testing module 606 can conclude that the field holds credit card numbers, and associate the field name with the appropriate label and probability. For the pattern matching logic, both the data itself of a given field and the patterns of the data in the field (e.g., identified in the profile data) can be used to discern which pattern tests to run and what labels to apply to the given data field.

The testing module 606 determines whether to perform a pattern analysis test on the source data 612. The determination can be a result of the classification data. The pattern match analysis uses profile data to determine whether the source data 612 conforms to predetermined patterns that are indicative of a candidate field label. For example, if the data of a field has a particular length and composition, the pattern match analysis identifies a corresponding candidate label. The pattern score applied to the label can be a function of how close a match the identified pattern is to the predetermined pattern, how distinctive the pattern is, or any number of factors. The weight can be adjusted as a function of the distinctiveness of the pattern. For example, a very unusual pattern may correspond to a higher weight value. If the values for a discovered field match the pattern closely (over all or a portion of the values), the score can be higher than if only a small number of values match the pattern.

The testing module 606 can include a keyword search test. The keyword test (which is similar to the business term matching test) includes data based tests including searches for particular keywords within data fields. For example, to find an address, the testing module 606 searches for common address words, such as "street", "road", "avenue", etc. The test can be extended by the user, who can add new keyword files to a specification of the reference database 216. The keyword tests can be used to find a word in a phrase or in part of a word, such as for addresses and company names in which there is a limited set of common words that can uniquely identify the data field.

The testing module 606 can determine whether to perform a keyword analysis on the field names. In this example, the testing module 606 would execute a keyword matching test if some of the fields still are not associated with label values. The field names (and possibly the field values) are checked for whether they include one or more keywords from a table, which may assist the testing module 606 in associating a particular label with the fields. The testing module 606 performs the keyword search and generates a keyword search score.

The testing module 606 can include a fingerprinting test for analyzing the data values of the source data. The logic of the fingerprinting generally includes a data lookup for data fields as a whole. Fingerprinting logic includes data value-based tests. The logic of fingerprinting data fields includes comparing a known list (e.g., from reference database 216) against the data of the data field to determine if the data of the data field correlates to the data of the list. For example, data from the data field can be compared to a list of first names, a list of state names, a list of city names, and so forth. The fingerprints (known data lists) are generally representative, rather than comprehensive. In other words, the fingerprint need not include each and every example of a value that is a part of the set of the fingerprint. Generally, the fingerprint can include selected example values representing approximately the most common values that should appear in the data entries of the data field. For example, the fingerprint does not need all possible first names in the U.S. for a first name table, but rather a selected group of the most popular names can be sufficient. For example, a top 100 names generally gives sufficient data for showing a correlation between the data field and the data fingerprint. The data fingerprints can be generated from master data. For example, a system might include the 50-100 most populous U.S. cities to check whether a data field corresponds to city names. A user can add new domains to a specification in order to increase the functionality of fingerprinting tests for a particular system.

The testing module 606 determines whether to check fingerprint tables for the fields. Fingerprinting can work well in situations where there is a long list of possible values for a field, but a few of the values are expected to be more common than others. For example, city names, street names, and even first and last names are good candidates for fingerprinting analysis. The testing module 606 performs the fingerprint analysis and generates a fingerprint score.

The testing module 606 determines whether to run a business term analysis. A business term analysis can be useful when there are many unique terms in the source data 612 that may correspond to business terms for labeling the fields. If the business analysis is performed, the testing module 606 performs a business terms analysis by comparing the field names to business terms to find matches and generate labels and their associated probabilities. The result of the business terms analysis is associated with a weight and score, similar to the pattern match analysis.

The testing module 606 can be configured to compare results across tests to improve results using corroboration logic. For example, corroboration logic can be used to validate a business term match using another classification test. For example, a test specifying that a data field includes maiden name values should also pass a classification test of being a last name field.

The testing module 606 is configured to execute machine learning logic in which classifications of prior datasets (e.g., from a particular source) or of prior iterations of the same dataset are remembered and influence which tests are selected for subsequent iterations and how the probability values of those subsequent iterations are determined. The machine learning logic is trained on the dataset and can apply the weights that are developed using the training data to classify new data of the dataset.

Each of the tests can output one or more proposed labels for the data field being analyzed. The tests need not be in agreement. Each proposed label can be associated with a score (not shown) and a weight value (not shown). The score and the weights for each label can be used by the results corroboration module 608 to suggest a particular label of the proposed labels as identifying the semantic meaning of the field and to categorize the label (or bucket the label) into a category. The category (subsequently described) indicates how much agreement there is among the tests and thus suggests a confidence of the proposed label as identifying the semantic meaning of the data for the field.

To execute the tests, the testing module 606 receives the profile data, classification data, and other reference data and determines whether each test is to be executed. For example, a test can be not executed if the type of data being received is not formatted for the particular test. Any combination of the tests can be executed. The testing module determines whether to execute a pattern analysis, determines whether to execute business term analysis, determines whether to execute a fingerprint analysis, and determines whether to execute a keyword search. Each test generates one or more proposed labels and outputs the proposed labels. The tests results including all the proposed labels are joined and sent to the results corroboration module 608 as test results.

In some implementations, subsequent tests can be performed if a result has not yet been found from the earlier tests. In some implementations, the testing module 606 prepares reference data by retrieving data from the reference database 216 based on the source data 612 being analyzed. For example, the testing module 606 can retrieve data from the reference database 216 based on a location of the source data 612, table names in the source data, user input, and so forth. The testing module 606 can determine which lookup tables are to be accessed and checked against each field of the source data. The choice of lookups can be performed based on the profile data received from the profile data module 604.

In some implementations, the testing module 606 determines whether to run a schema analysis. The schema analysis can be used to analyze the source data 612 over time and as a whole. For example, if fields are missing, added, deleted, and so forth, the information can be used for labeling other data fields.

In some implementations, once the tests have each been completed, the testing module 606 combines the associated scores to generate a final score, which is shown with the associated proposed label to which the score applies. In some implementations, upstream scores affect downstream scores, so that the scores are not distinct from one another, but represent a score that is updated as each analysis occurs. In some implementations, each proposed label and its score are separately reported to the results corroboration module 608, which then determines how to categorize the test results 306.

In some implementations, the order of the tests can be such that more processing-intensive tests are scheduled last. The more time-intensive tests can be a last resort if other tests fail. Ordering tests in this way can reduce processing time on the execution system 602 for labeling the source data 612.

Once the testing module 606 has run classification tests for the source data and determined probability values for labels of data fields of the source data, the results corroboration module 608 performs a check to determine whether the classified results are indicative of a high confidence or whether further testing should be performed.

The results corroboration module 608 receives the test results of the different tests executed on the source data by the testing module 606 and determines whether the results corroborate or conflict with each other. The results of the tests of the testing module 606 are sorted into several classification categories by the results corroboration module 608. The categories include a match category, a recommendation category, an investigate category, and an ignore category. Each of the categories is indicative of a similarity among the label proposals in the test results. For example, of all the label proposals are identical, the test results have a high level of similarity. If each label proposal is different, the test results have a low level of similarity. The similarity can be more than just a voting mechanism by each of the test. Each label proposals is associated with a weighted score value. If one label proposal of a test does not match the others, but is associated with a relatively high score value and a large weight compared to the other proposed labels of the other tests, then the similarity can be identified as being lower despite that three of four tests are in agreement.

Depending on the category identified, the results corroboration module 608 can either automatically validate the label as identifying the semantic meaning of the field or it can prompt a user to manually validate the label. Validation can be done through a client device on a user interface, as subsequently described.

The match category is indicative of the highest level of confidence for a label (e.g., a 100 match). In some implementations, matched labels are automatically included in the metadata associated with the source data. However, the results corroboration module 608 can still be configured to present this result to a user for manual validation. Generally, a match categorization indicates that all the executed tests proposed the same label. In some implementations, the match category can be selected if the labels do not all match, but when any dissenting labels were below a score threshold, indicating general agreement among the tests.

The recommendation category generally indicates that at least one label has a high quality association to the data field. However, the recommended label is generally below a threshold level set for a highest confidence, and further validation is preferred. In some implementations, a recommendation category is indicative of several high quality labels being associated with the data field. In some implementations, the results corroboration module 608 ranks and lists the recommended labels, each with a probability score, which can aid a user in selecting the best label(s) for the data field.

The investigate category is indicative of a value or a data field having some interesting statistical property that does not pass any particular test. For example, the data field can appear as though it should have a meaning, but no tests have proposed labels, or they have or the proposed labels have scores below a given threshold. For example, the data field can include profile attributes indicating that the data field is a domain or field of significance in the source data, but no labels are recommended (or recommended above a threshold probability). Generally, such a result indicates that additional rules should be added to the tests (e.g., the tests should be extended or changed somehow) and performed again.

The ignore category indicates that a data field is either designated as uninteresting or that the field triggered no tests and displayed no profile attributes suggesting that the data field is significant. Generally, the ignore category is shown when the data received have errors or have no discernable pattern. While the ignore category may indicate that a new label should be defined, it generally indicates that the field includes miscellaneous data that has no particular structure.

Generally, to categorize (e.g., bucket) the test results into a category, the results corroboration module 608 performs a process. The results corroboration module 608 compares the test results from the field. For each field, the results corroboration module assigns the tests results to a category based on the level of similarity.

In addition to generating a classification file specifying a classification category, the results corroboration module 608 is configured to generate other files. The other files include a profile comments file. The profile comments file is a file that describes the results of the classification analysis process. The other files include a discovery results summary, which describes the combined output form the business term matching process and the fingerprinting process.

The results corroboration module 608 is configured to determine whether there are outliers for data values based on aggregates and ranges for each data field. Outliers include data values that do not conform to an identified relationship or format for a data field. Results corroboration module 608 determines outliers are determined based on clustering and predictions of relationships from the classification of the testing module 606.

The processes described above can be iterated to increase the accuracies of the classifications and enable a user to update the classification tests to get better results. As stated previously, in some implementations, machine learning logic can be used to train classifier(s) during each iteration to facilitate this process. Generally, once the profile data is generated by the profile data module 604, the processes of the testing module 606 and the results corroboration module 608 are iterated; new profile data need not be repeatedly generated unless the source data itself is updated.

Once the profile data module 604, the classification module 605, the testing module 606, and the results corroboration module 608 have generated labels for each of the data fields, the load data module 610 can load the metadata including the label index into the reference database 216. The load data module 610 executes a process for updating the label index and loading the data into the reference database 216. The load data module 610 receives the field name and receives the proposed label for the field, which has been validated either manually or automatically. The load data module 610 joins the field name and the proposed label. The load data module updates the label index by associating the label with the field's location in the dataset. The load data module joins the labels for the datasets being analyzed into a label index that can be referenced for the dataset by the execution system 602 and by downstream applications.

Generally the reference database 216 can be accessed by one or more downstream computing systems for various applications. For example, the generated labels of datasets can be used for data quality enforcement, personal data anonymization, data masking, (PII) reports, test data management, dataset annotation, and so forth.

The load data module 610 is configured to package the metadata and the source data into a package that is usable by one or more other computing systems. For example, once the profile data is generated, the operations of the classification module 605, the testing module 606 and the results corroboration module 608 can be each configured to run multiple instances of their processes in parallel on different partitions of the source data. For example, if the source data includes a plurality of tables, the source data can be partitioned by table. The testing module 606 and the results corroboration module 608 can run instances of their logical processes on a plurality of tables concurrently to increase throughput of the processes of the execution system 602. Once the source data are labeled, the load data module 610 can be configured to merge the partitions back together and store the labeled source data in the reference database 216.

FIGS. 9-12 show flow diagrams each including an example process. FIG. 9 shows a process 900 for determining a data quality rule for values in one or more datasets. The process 900 can be implemented by a data processing system such as previously described. The process 900 includes receiving (902), by the data processing system, the one or more datasets, with the one or more datasets including a field and with the field storing values. The process 900 includes profiling (904), by the data processing system, the values stored in the field included in the one or more datasets. The process includes applying (906), by the data processing system, one or more classifiers to the profiled values. The process 900 includes identifying (908) one or more label proposals identifying a semantic meaning for the field, with each of the one or more label proposals having a calculated confidence level. The process 900 includes labeling (910) the field with a label proposal having a calculated confidence level that satisfies a threshold level. The process 900 includes determining (912), based on the label proposal that labels the field, a profile for the field, the profile representing one or more features for values included in the field having the label proposal. The process 900 includes, based on the determined profile, determining (914) a data quality rule for the field of the dataset.

Figure 10:
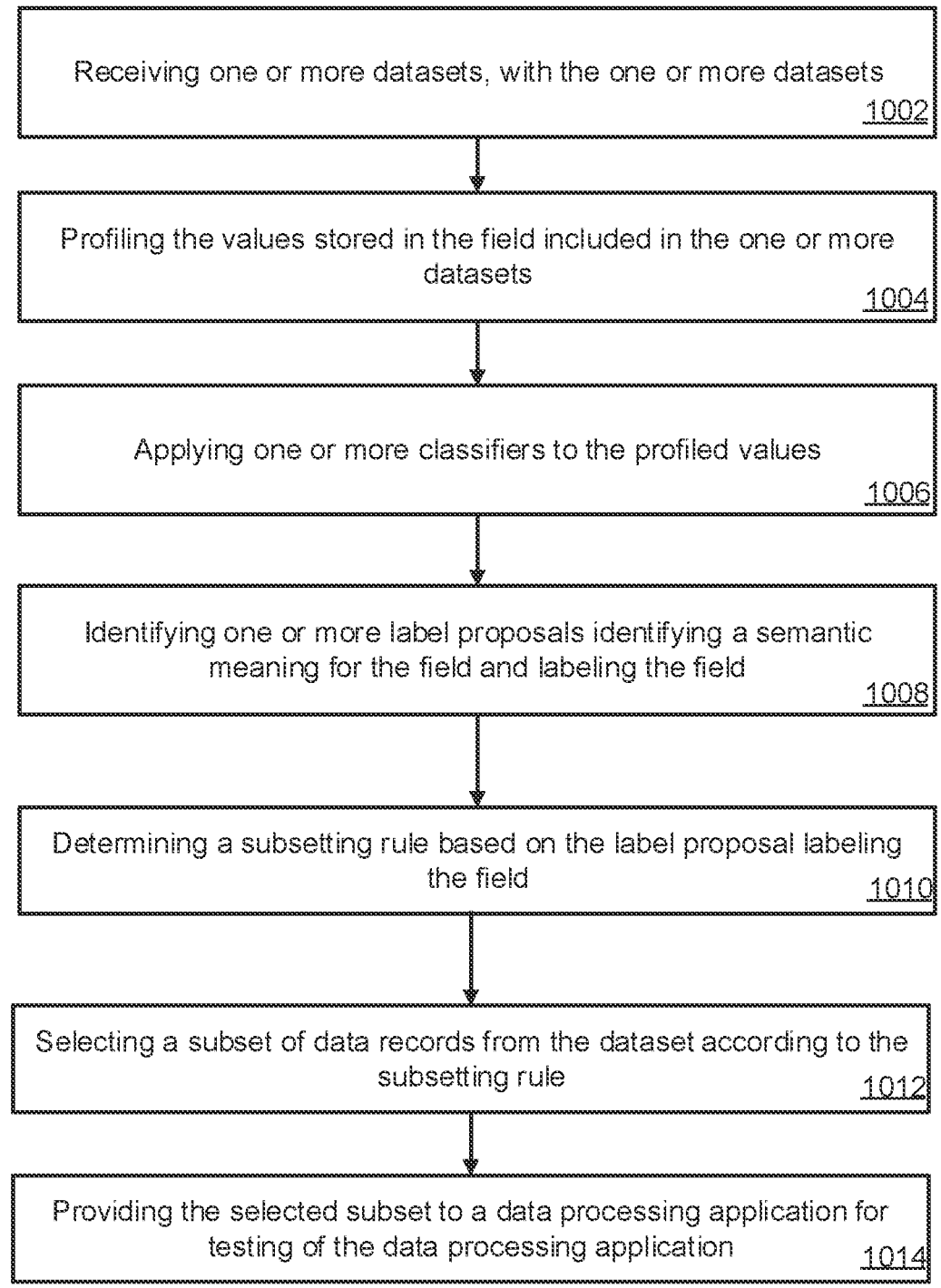

FIG. 10 shows a process 1000 for selecting test data to cause execution of a processing rule during testing of a data processing application. The process 1000 can be implemented by a data processing system such as previously described. The process 1000 includes receiving (1002), by the data processing system, the one or more datasets, with the one or more datasets including a field and with the field storing values. The process 1000 includes profiling (1004), by the data processing system, the values stored in the field included in the one or more datasets. The process includes applying (1006), by the data processing system, one or more classifiers to the profiled values. The process 1000 includes identifying (1008) one or more label proposals identifying a semantic meaning for the field, with each of the one or more label proposals having a calculated confidence level and labeling the field with the label proposal having a calculated confidence level that satisfies a threshold level. The process 1000 includes determining (1010) a subsetting rule based on the label proposal labeling the field. The process 1000 includes selecting (1012) a subset of data records from the dataset according to the subsetting rule, the selecting of the subset being based on label proposals labeling fields of the dataset. The process 1000 includes providing (1014) the selected subset to a data processing application for testing of the data processing application.

Figure 12:
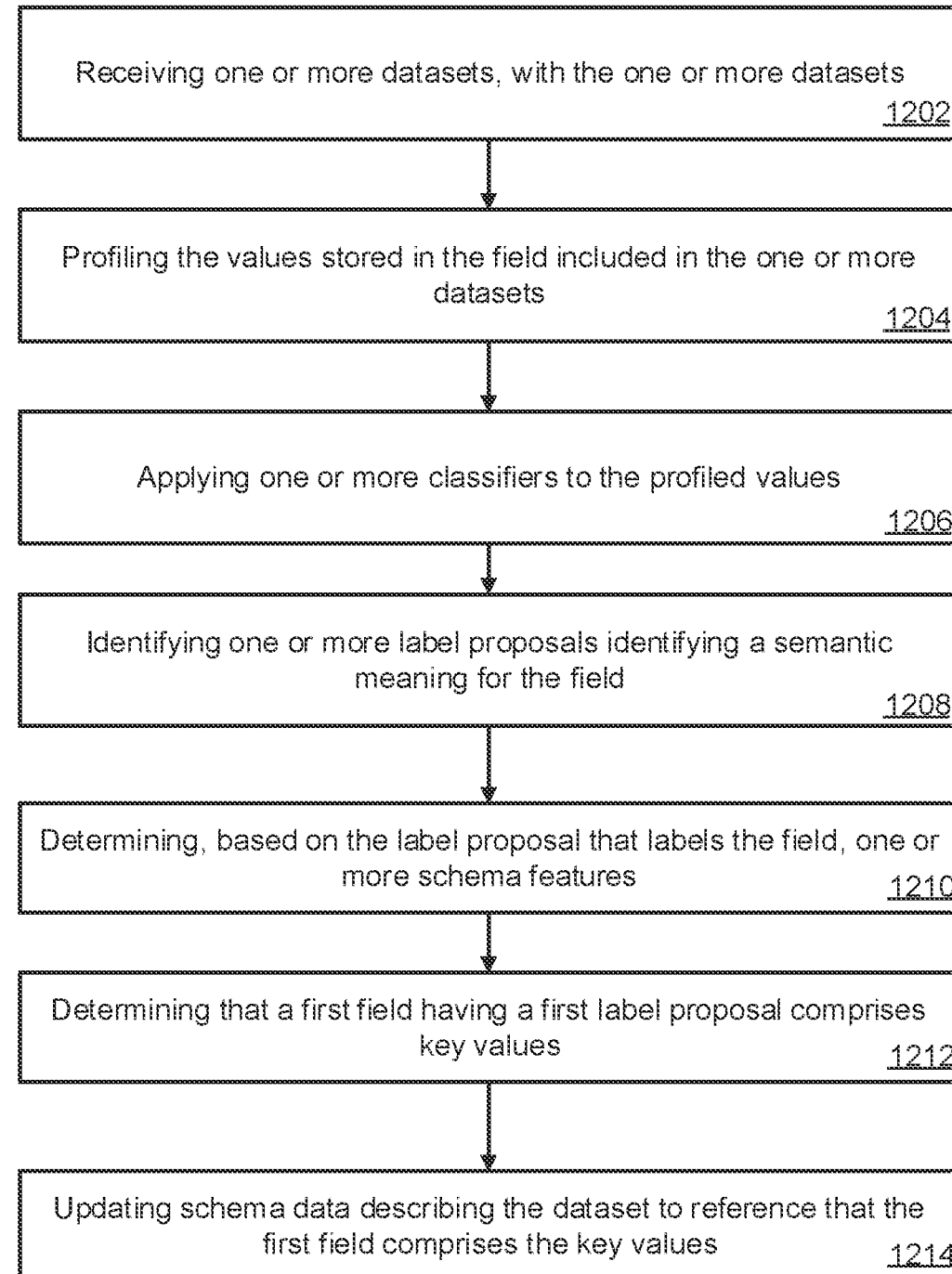

FIG. 11 shows a process 1100 for masking data of a data processing application. The process 1100 can be implemented by a data processing system such as previously described. The process 1100 includes receiving (1102), by the data processing system, the one or more datasets, with the one or more datasets including a field and with the field storing values. The process 1100 includes profiling (1104), by the data processing system, the values stored in the field included in the one or more datasets. The process includes applying (1106), by the data processing system, one or more classifiers to the profiled values. The process 1100 includes identifying (1108) one or more label proposals identifying a semantic meaning for the field, with each of the one or more label proposals having a calculated confidence level and labeling the field with the label proposal having a calculated confidence level that satisfies a threshold level. The process 1100 includes determining (1110), based on the label proposal, that the field of the dataset represents sensitive data. The process 1100 includes performing (1112), in response to the determining, a data masking function to transform values including the sensitive data of the field into masked values FIG. 12 shows a process 1200 for determining a schema of a dataset. The process 1200 can be implemented by a data processing system such as previously described. The process 1200 includes receiving (1202), by the data processing system, the one or more datasets, with the one or more datasets including a field and with the field storing values. The process 1200 includes profiling (1204), by the data processing system, the values stored in the field included in the one or more datasets. The process includes applying (1206), by the data processing system, one or more classifiers to the profiled values. The process 1200 includes identifying (1208) one or more label proposals identifying a semantic meaning for the field, with each of the one or more label proposals having a calculated confidence level and labeling the field with the label proposal having a calculated confidence level that satisfies a threshold level. The process 1200 includes determining (1210), based on the label proposal that labels the field, one or more schema features for values included in the field having the label proposal. The process 1200 includes determining (1212), based on the one or more schema features, that a first field having a first label proposal comprises key values being referenced by values of a second field having a second label proposal. The process 1200 includes updating (1214), in response to the determining, schema data describing the dataset to reference that the first field comprises the key values being referenced by the values of the second field.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the modules of the data processing device 102 can be implemented using digital electronic circuitry, or in computer software, firmware, or hardware, or in combinations of one or more of them. In another example, the processes 900, 1000, 1100, and 1200, can be implemented using digital electronic circuitry, or in computer software, firmware, or hardware, or in combinations of one or more of them.

Some implementations described in this specification (e.g., the data quality rule module 104, the test dataset module 106, the data masking module 108, the dataset schema analysis module 110, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the data quality rule module 104 and/or the data structure module 106 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, e.g., both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

An example computer system includes a processor, a memory, a storage device, and an input/output device. Each of the components can be interconnected, for example, by a system bus. The processor is capable of processing instructions for execution within the system. In some implementations, the processor is a single-threaded processor, a multi-threaded processor, or another type of processor. The processor is capable of processing instructions stored in the memory or on the storage device. The memory and the storage device can store information within the system.

The input/output device provides input/output operations for the system. In some implementations, the input/output device can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for determining a schema of a data record, the method including:
retrieving a label index that associates a label with a set of one or more fields in the data record, wherein the label identifies a type of information expected in a field of the set of the one or more fields;
accessing an index that associates the type of information indicated by the label with a set of attribute values representing requirements for values of the one or more fields associated with the label, the requirements including logical or syntactical characteristics of the values for the one or more fields; and
for a first field of a particular data record:
identifying, by accessing the label index, a particular label associated with the first field of the particular data record;
retrieving, from the index, an attribute value for the particular label, the attribute value specifying a particular requirement for the first field;
determining that the particular requirement specified by the attribute value includes a schema feature for values included in the first field;
determining, based on the schema feature, a relationship between the first field and a second field in the data record; and
generating an output that indicates the relationship between the first field and the second field in the data record.

2. The method of claim 1, further including:
determining, based on the schema feature, that the first field having the label includes key values being referenced by values of a second field; and
in response to the determining, updating schema data describing the particular data record to reference that the first field includes the key values being referenced by the values of the second field.

3. The method of claim 1, further including:
determining, based on the schema feature, that the first field is a key field.

4. The method of claim 1, wherein the relationship is indicative of a dependency of a value of the second field on a value of the first field or the value of the first field on the value of the second field.

5. The method of claim 1, wherein the relationship is indicative of a correlation between a value of the first field and a value of the second field.

6. The method of claim 1, further including obtaining validation data that validates the relationship for each value of the first field and the second field.

7. The method of claim 1, wherein the relationship is validated for a threshold number of values for the first field and the second field.

8. The method of claim 1, wherein the schema feature is configured to specify a constraint on a value of the second field based on a value of the first field.

9. The method of claim 1, wherein the first field and the second field each includes numeric values, and wherein determining that the relationship exists between the first field and the second field includes determining a numerical function that relates values of the first field to values of the second field.

10. The method of claim 1, wherein determining that the relationship exists between the first field and the second field includes using at least one classifier configured by a machine learning process.

11. The method of claim 1, further including:
determining that the schema feature indicates that the first field includes primary key values for the particular data record; and
configuring a data quality rule to require that the primary key values are each unique in the first field.

12. The method of claim 1, wherein the method includes storing data associating the schema feature and the particular label.

13. A data processing system for determining a schema of a data record, the data processing system including:
at least one processing device; and
at least one memory in communication with the at least one processing device, the at least one memory storing instructions that, when executed by the at least one processing device, cause the at least one processing device to perform operations including:
retrieving a label index that associates a label with a set of one or more fields in the data record, wherein the label identifies a type of information expected in a field of the set of the one or more fields;
accessing an index that associates the type of information indicated by the label with a set of attribute values representing requirements for values of the one or more fields associated with the label, the requirements including logical or syntactical characteristics of the values for the one or more fields; and
for a first field of a particular data record:
identifying, by accessing the label index, a particular label associated with the first field of the particular data record;
retrieving, from the index, an attribute value for the particular label, the attribute value specifying a particular requirement for the first field;
determining that the particular requirement specified by the attribute value includes a schema feature for values included in the first field;
determining, based on the schema feature, a relationship between the first field and a second field in the data record; and
generating an output that indicates the relationship between the first field and the second field in the data record.

14. The data processing system of claim 13, the operations further including:
determining, based on the schema feature, that the first field having the label includes key values being referenced by values of a second field; and
in response to the determining, updating schema data describing the particular data record to reference that the first field includes the key values being referenced by the values of the second field.

15. The data processing system of claim 13, the operations further including:
determining, based on the schema feature, that the first field is a key field.

16. The data processing system of claim 13, wherein the relationship is indicative of a dependency of a value of the second field on a value of the first field or the value of the first field on the value of the second field.

17. The data processing system of claim 13, wherein the relationship is indicative of a correlation between a value of the first field and a value of the second field.

18. The data processing system of claim 13, further including obtaining validation data that validates the relationship for each value of the first field and the second field.

19. One or more non-transitory computer readable media storing instructions for determining a schema of a data record, wherein the instructions, when executed by at least one processing device, are configured to cause the at least one processing device to perform operations including:
retrieving a label index that associates a label with a set of one or more fields in the data record, wherein the label identifies a type of information expected in a field of the set of the one or more fields;
accessing an index that associates the type of information indicated by the label with a set of attribute values representing requirements for values of the one or more fields associated with the label, the requirements including logical or syntactical characteristics of the values for the one or more fields; and
for a first field of a particular data record:
identifying, by accessing the label index, a particular label associated with the first field of the particular data record;
retrieving, from the index, an attribute value for the particular label, the attribute value specifying a particular requirement for the first field;
determining that the particular requirement specified by the attribute value includes a schema feature for values included in the first field;
determining, based on the schema feature, a relationship between the first field and a second field in the data record; and
generating an output that indicates the relationship between the first field and the second field in the data record.

20. The one or more non-transitory computer readable media of claim 19, the operations further including:

determining, based on the schema feature, that the first field having the label includes key values being referenced by values of a second field; and in response to the determining, updating schema data describing the particular data record to reference that the first field includes the key values being referenced by the values of the second field.

* * * * *